US010701359B2

(12) United States Patent
Su

(10) Patent No.: US 10,701,359 B2
(45) Date of Patent: *Jun. 30, 2020

(54) REAL-TIME CONTENT-ADAPTIVE PERCEPTUAL QUANTIZER FOR HIGH DYNAMIC RANGE IMAGES

(71) Applicant: DOLBY LABORATORIES LICENSING CORPORATION, San Francisco, CA (US)

(72) Inventor: Guan-Ming Su, Fremont, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 312 days.

This patent is subject to a terminal disclaimer.

(21) Appl. No.: 15/573,098

(22) PCT Filed: Mar. 1, 2016

(86) PCT No.: PCT/US2016/020232
§ 371 (c)(1),
(2) Date: Nov. 9, 2017

(87) PCT Pub. No.: WO2017/003525
PCT Pub. Date: Jan. 5, 2017

(65) Prior Publication Data
US 2018/0115774 A1     Apr. 26, 2018

Related U.S. Application Data

(60) Provisional application No. 62/187,091, filed on Jun. 30, 2015.

(51) Int. Cl.
*H04N 11/02*     (2006.01)
*H04N 19/124*     (2014.01)
(Continued)

(52) U.S. Cl.
CPC ......... *H04N 19/124* (2014.11); *H04N 19/136* (2014.11); *H04N 19/186* (2014.11); *H04N 19/98* (2014.11)

(58) Field of Classification Search
CPC .. H04N 19/124; H04N 19/136; H04N 19/186; H04N 19/98
(Continued)

(56) References Cited

U.S. PATENT DOCUMENTS 10,015,491 B2 *  7/2018  Su .................. H04N 19/30
10,080,026 B2 *  9/2018  Su .................. H04N 19/1887
(Continued)

FOREIGN PATENT DOCUMENTS

WO  2013/086169  6/2013
WO  2014/130343  8/2014
(Continued)

OTHER PUBLICATIONS

BBC Research Department Report "Accommodating the Residue of Processed or Computed Digital Video Signals within the 8 Bit CCIR Recommendation 601" Sep. 1987, pp. 1-15.
(Continued)

*Primary Examiner* — Jayanti K Patel
*Assistant Examiner* — Richard B Carter

(57) ABSTRACT

Noise levels in pre-reshaped codewords of a pre-reshaped bit depth in pre-reshaped images within a time window of a scene are calculated. Per-bin minimal bit depth values are computed for pre-reshaped codeword bins based on the calculated noise levels in the pre-reshaped codewords. Each per-bin minimal bit depth value corresponds to a minimal bit depth value for a respective pre-reshaped codeword bin. A specific codeword mapping function for a specific pre-reshaped image in the pre-reshaped image is generated based on the pre-reshaped bit depth, the per-bin minimal bit
(Continued)

depth values, and a target bit depth smaller than the pre-reshaped bit depth. The specific codeword mapping function is applied to specific pre-reshaped codewords of the specific pre-reshaped image to generate specific target codewords of the target bit depth for a specific output image.

19 Claims, 14 Drawing Sheets

(51) Int. Cl.
    *H04N 19/136*      (2014.01)
    *H04N 19/98*      (2014.01)
    *H04N 19/186*      (2014.01)

(58) Field of Classification Search
    USPC ................................. 375/240.03; 382/154
    See application file for complete search history.

(56) References Cited

U.S. PATENT DOCUMENTS

| | | | | |
|---|---|---|---|---|
| 10,419,762 B2* | 9/2019 | Froehlich | ............. | H04N 19/132 |
| 2015/0371393 A1* | 12/2015 | Ramachandra | ......... | G06T 5/002 |
| | | | | 382/154 |

FOREIGN PATENT DOCUMENTS

| WO | 2014/160705 | 10/2014 |
|---|---|---|
| WO | 2014/204865 | 12/2014 |
| WO | 2016/140954 | 9/2016 |

OTHER PUBLICATIONS

Zhang, Y. et al "High Dynamic Range Video Compression by Intensity Dependent Spatial Quantization in HEVC" IEEE Picture Coding Symposium, Dec. 8, 2013, pp. 353-356.

Mantiuk, R. et al "Lossy Compression of High Dynamic Range Images and Video" Proc. of SPIE Electronic Imaging vol. 6057, Jan. 16, 2006, pp. 1-10.

Zhang, Y. et al "Perception-Based High Dynamic Range Video Compression with Optimal Bit-Depth Transformation" 18th IEEE International Conference on Image Processing, Sep. 11, 2011, pp. 1321-1324.

Miller, S. et al "Perceptual Signal Coding for More Efficient Usage of Bit Codes" SMPTE Motion Imaging Journal, vol. 122, No. 4, May 1, 2013, pp. 52-59.

ITU Rec.BT 1886 "Reference Electro-Optical Transfer Function for Flat Panel Displays used in HDTV Studio Production" Mar. 2011.

SMPTE ST 2084:2014 "High Dynamic Range EOTF of Mastering Reference Displays", SMPTE 2014.

Stessen J. et al., "Chromaticity Based Color Signals for Wide Color Gamut and High Dynamic Range", ISO/IEC JTC1/SC29/WG11 MPEG 2014/M35065, Oct. 2014 pp. 18.

* cited by examiner

```
calculate noise levels with a processor a set of
input images in an input bit depth 1202
```

```
apply a noise-mask generation process to the
input image to generate a noise mask image 1204
```

```
generate a noise-mask histogram based on
the input image and the noise mask image 1206
```

```
for bins in the noise-mask histogram, apply a
masking-noise level to bit-depth function to
generate minimal bit depth values for the one or
more bins 1208
```

```
generate a codeword mapping function based on
the input bit depth 1210
```

```
apply the codeword mapping function to the input
image to generate an output image in the target
bit depth 1212
```

FIG. 12A calculate noise levels in pre-reshaped codewords in a plurality of pre-reshaped images within a time window of a scene 1252 determine a plurality of per-bin minimal bit depth values for a plurality of pre-reshaped codeword bins based at least in part on the calculated noise levels in the pre-reshaped codewords 1254 generate, based at least in part on the pre-reshaped bit depth, the plurality of per-bin minimal bit depth values 1256 apply the specific codeword mapping function to specific pre-reshaped codewords of the specific pre-reshaped image to generate specific target codewords of a specific output image 1258

FIG. 12B

REAL-TIME CONTENT-ADAPTIVE PERCEPTUAL QUANTIZER FOR HIGH DYNAMIC RANGE IMAGES

CROSS-REFERENCE TO RELATED APPLICATIONS

This Application claims the benefit of priority to Provisional U.S. Patent Application No. 62/187,091, filed on Jun. 30, 2015, which is hereby incorporated by reference in its entirety.

TECHNOLOGY

The present invention relates generally to images. More particularly, an embodiment of the present invention relates to content-adaptive perceptual quantization of images with high dynamic range.

BACKGROUND

As used herein, the term 'dynamic range' (DR) may relate to a capability of the human visual system (HVS) to perceive a range of intensity (e.g., luminance, luma) in an image, e.g., from darkest darks (blacks) to brightest brights (whites). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is included herein by reference in its entity, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays," which is incorporated herein by reference in its entirety. In general, without limitation, the methods of the present disclosure relate to any dynamic range higher than SDR. As appreciated by the inventors here, improved techniques for the perceptual quantization of high-dynamic range images are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 12A and FIG. 12B illustrate example process flows system in accordance with example embodiments disclosed herein.

DESCRIPTION OF EXAMPLE EMBODIMENTS

Content-adaptive techniques for the perceptual quantization of high dynamic range (HDR) images are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the adaptive perceptual quantization of images. A content-adaptive quantizer processor receives an input image with an input bit depth. A noise-mask generation process is applied to the input image to generate a noise mask image which characterizes each pixel in the input image in terms of its perceptual relevance in masking quantization noise. A noise mask histogram is generated based on the input image and the noise mask image. A masking-noise level to bit-depth function is applied to the noise mask histogram to generate minimal bit depth values for each bin in the noise mask histogram. A codeword mapping function is generated based on the input bit depth, a target bit depth, and the minimal bit depth values. The codeword mapping function is applied to the input image to generate an output image in the target bit depth, which is lower than the input bit depth.

Example embodiments described herein relate to performing real-time content-adaptive reshaping of images from a pre-reshaped bit depth to a target bit depth that is lower than the pre-reshaped bit depth. Noise levels in pre-reshaped codewords of the pre-reshaped bit depth in a plurality of pre-reshaped images within a time window of a scene are calculated. A plurality of per-bin minimal bit depth values is computed for a plurality of pre-reshaped codeword bins based at least in part on the calculated noise levels in the pre-reshaped codewords. Each per-bin minimal bit depth value in the plurality of per-bin minimal bit depth values corresponds to a minimal bit depth value for a respective pre-reshaped codeword bin in the plurality of pre-reshaped codeword bins. A specific codeword mapping function for a specific pre-reshaped image in the plurality of pre-reshaped images is generated based at least in part on the pre-reshaped bit depth, the plurality of per-bin minimal bit depth values, and the target bit depth. The specific codeword mapping function is applied to specific pre-reshaped codewords of the specific pre-reshaped image to generate specific target codewords of the target bit depth for a specific output image.

Example Video Delivery Processing Pipeline

Figure 1A:
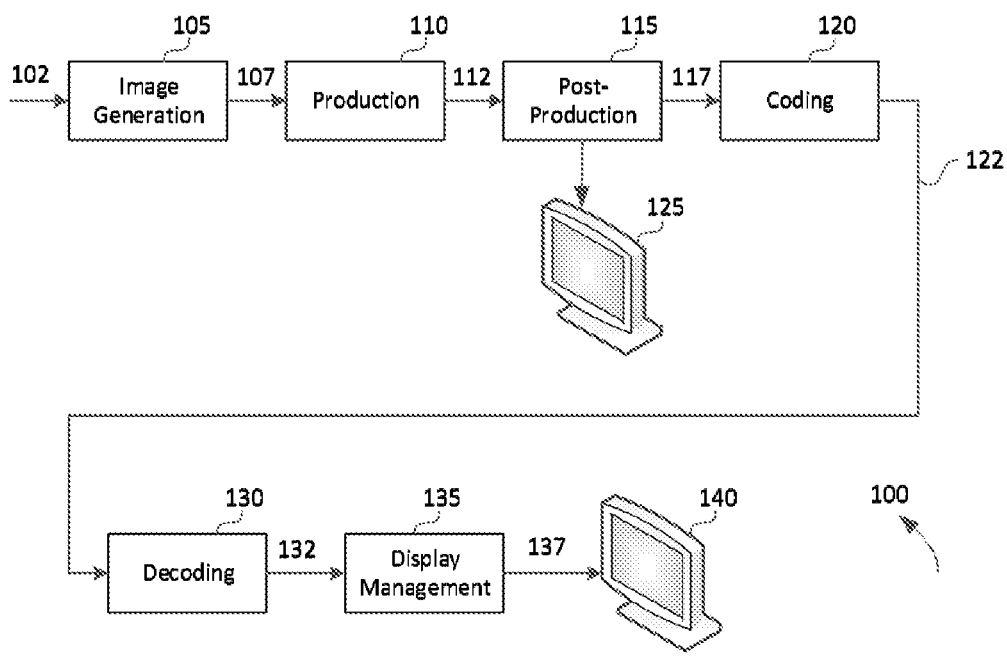
FIG. 1A depicts an example process for a video delivery pipeline.

FIG. 1A depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Signal Quantization

Currently, most digital interfaces for video delivery, such as the Serial Digital Interface (SDI) are limited to 12 bits per pixel per component. Furthermore, most compression standards, such as H.264 (or AVC) and H.265 (or HEVC), are limited to 10-bits per pixel per component. Therefore efficient encoding and/or quantization is required to support HDR content, with dynamic range from approximately 0.001 to 10,000 $cd/m^2$ (or nits), within existing infrastructures and compression standards.

The term "PQ" as used herein refers to perceptual luminance amplitude quantization. The human visual system responds to increasing light levels in a very non-linear way. A human's ability to see a stimulus is affected by the luminance of that stimulus, the size of the stimulus, the spatial frequencies making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. An examples of PQ mapping functions (or EOTFs) is described in SMPTE ST 2084:2014 "High Dynamic Range EOTF of Mastering Reference Displays," which is incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve imitates the true visual response of the human visual system using a relatively simple functional model.

For example, under SMPTE ST 2084, at 1 cd/m$^2$, one 12-bit code value corresponds to a relative change of approximately 0.0048 cd/m$^2$; however, at 1,000 cd/m$^2$, one 12-bit code value corresponds to a relative change of approximately 2.24 cd/m$^2$. This non-linear quantization is needed to accommodate for the non-linear contrast sensitivity of the human visual system (HVS).

Another example of a perceptually-quantized EOTF is presented in "Chromaticity based color signals for wide color gamut and high dynamic range," by J. Stessen et al., ISO/IEC JTC1/SC29/WG11 MPEG2014/M35065, October 2014, which is incorporated herein by reference in its entirety.

Contrast sensitivity of the HVS does not only depend on luminance but also on masking characteristics of the image content (most particularly noise and texture), as well as the adaptation state of the HVS. In other words, depending on the noise level or the texture characteristics of an image, image content can be quantized with larger quantization steps than those predicted by PQ or gamma quantizers, because texture and noise mask quantization artifacts. The PQ quantization describes the best the HVS can do, which occurs when there is no noise or masking in the image. However, for many images (frames of a video), there is significant masking.

In addition to noise and texture masking, other characteristics of visual behavior, such as optical flare and local adaptation may also be taken into consideration to increase the level of quantization and allow representing HDR images at 10-bits or lower per color component. As used herein, the terms "Content-Adaptive PQ" or "Adaptive PQ" for short, denote methods to adaptively adjust the perceptually quantization of images based on their content.

Figure 1B:
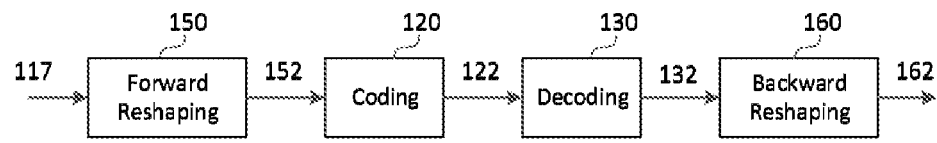
FIG. 1B depicts an example process for data compression using content-adaptive quantization or reshaping in accordance with example embodiments disclosed herein.

FIG. 1B depicts an example process for Adaptive PQ according to an embodiment. Given input frames (117), a forward reshaping block (150) analyzes the input and the coding constrains and generates codeword mapping functions which map input frames (117) to re-quantized output frames (152). For example, input (117) may be gamma-coded or PQ-coded according to certain EOTF. In some embodiments, information about the reshaping process may be communicated to downstream devices (such as decoders) using metadata. Following coding (120) and decoding (130), decoded frames (132) may be processed by a backward reshaping function (160), which converts the re-quantized frames (132) back to the original EOTF domain (e.g., gamma or PQ), for further downstream processing, such as the display management process (135) discussed earlier. In some embodiments, the backward reshaping function (160) may be integrated with a de-quantizer in decoder (130), e.g., as part of the de-quantizer in an AVC or HEVC video decoder.

Adaptive PQ

Figure 2:
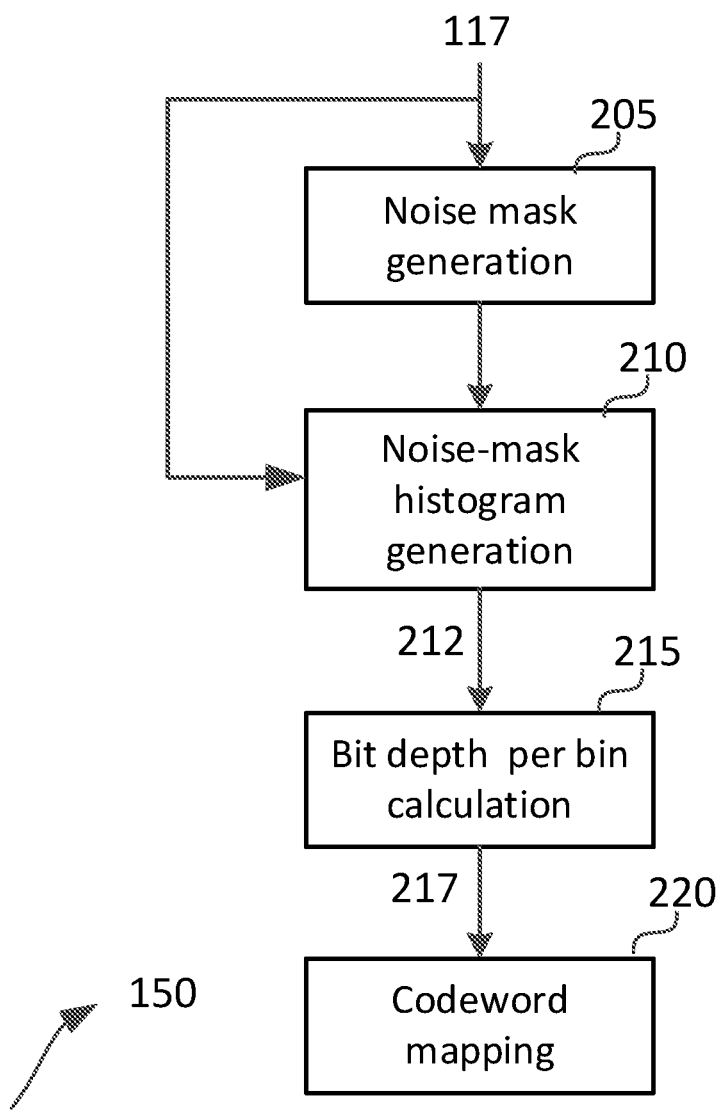
FIG. 2 depicts an example process for content-adaptive perceptual quantization in accordance with example embodiments disclosed herein.

FIG. 2 depicts an example process for content-adaptive perceptual quantization according to an embodiment of this invention. As depicted in FIG. 2, given a sequence of images (e.g., video frames) (117), block (205) is used to generate a noise mask image which characterizes each pixel in the input image in terms of its perceptual relevance in masking quantization noise. The noise mask image, in combination with the original image data, is used in step (210) to generate a noise mask histogram. Block (215) estimates the number of minimum bits required for each bin of the histogram generated in step (210), and finally, codeword mapping block (220) computes the mapping function to translate the input signal (117) to its quantized output. Each of these steps is described in more detail next.

Noise Mask Generation

Figure 3:
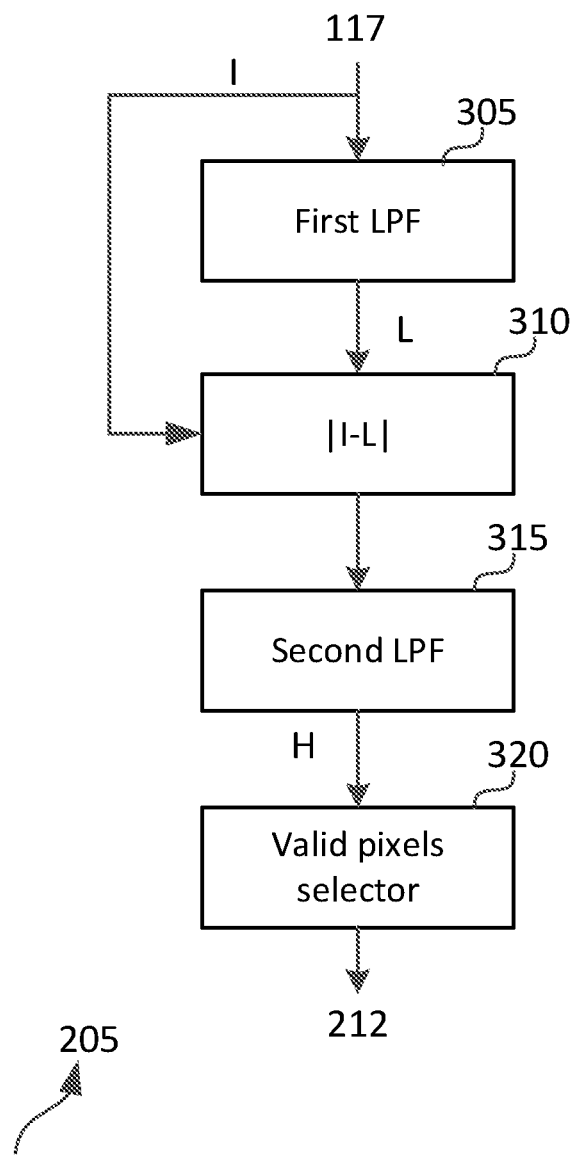
FIG. 3 depicts an example process for noise-mask generation in accordance with example embodiments disclosed herein.

The basic idea of adaptive PQ is to allocate fewer bits in areas of the image that are noisy or have high texture, and more bits in areas of the image that are perceived as noise-free or smoother. Given an input image (117), the noise-mask generation block (205) generates an estimate of masking noise for each pixel in the image. In some embodiments, input (117) may be already coded using a gamma or PQ-based quantizer. In some other embodiments, input image (117) may be in linear space. FIG. 3 depicts an example process of noise mask generation according to an embodiment. Some other embodiments may generate noise masks using alternative methods known in the art for measuring local entropy in images, such as entropy filtering over a moving window, standard deviation filtering over a moving window, or range filtering over a moving window.

Let $I_{jp}$ denote the p-th pixel of a color component under quantization (e.g., luminance) in the j-th frame in the input sequence (117), normalized to [0 1). Let $v_{Lj}$ and $v_{Hj}$ denote the minimum and maximum pixel values in this frame, or $$v_{Lj} = \min\{I_{jp}\},$$

$$v_{Hj} = \max\{I_{jp}\}. \quad (1)$$

As depicted in FIG. 3, in block (305) a first low-pass filter is applied to image frame $I_j$. In an embodiment, this filter mimics the characteristics of the human visual system. Depending on the available computational power, this filter may range from a very simple filter, like a Box filter or a Gaussian filter, to more complex filter banks, like those implementing the Cortex transform. In an embodiment, the first filter may be a two-dimensional Gaussian filter $G(r_L, \sigma_L^2)$ with support range $r_L$ and variance $\sigma_L^2$ (e.g., $r_L=9$ and $\sigma_L^2=3$ or $r_L=33$ and $\sigma_L^2=4$). Then, its output (L) may be expressed as $$L_{jp} = I_{jp} \otimes G(r_L, \sigma_L^2), \quad (2)$$

where the symbol $\otimes$ denotes a convolution. Given the output of the first filter, the high frequencies components of the input frame may be extracted in block (310) as $$\tilde{H}_{jp} = |I_{jp} - L_{jp}|. \quad (3)$$

The output of block (310) may then be filtered again by a second low-pass filter (315) to generate the noise mask (H). This is to address the low-phase accuracy of HVS masking (that is, there is still masking at the zero crossings of a masking signal). In an embodiment, the second LPF may also be a Gaussian filer with support range $r_H$ and variance $\sigma_H^2$ (e.g., $r_H=9$, $\sigma_H^2=3$). Then, the noise mask (H) may be expressed as $$H_{jp} = \tilde{H}_{jp} \otimes G(r_H, \sigma_H^2). \quad (4)$$

In an embodiment, the parameters of the first and second low pass filters may be the same. In a preferred embodiment, the first and second low-pass filters are separable filters to improve computational efficiency. In an embodiment, an optional block (320) may be used to identify $H_{jp}$ pixels that can be ignored in subsequent processing since they may bias the adaptive quantization process. For example, if the image includes a letterbox frame (that is, black pixels that may frame the original image so that it conforms to a particular frame size or aspect ratio), then values related to the letterbox pixels may be ignored. Values related to image boundaries or letterbox boundaries may also be ignored since the output of the low-pass filters assumes that data at these borders are padded with constant values, which will generate lower noise values. Let $\Omega_j$ denote the set of all valid pixels under considerations, then the final output noise mask (322) may be expressed as $$H_j(i), i \in \Omega_j. \quad (5)$$

Noise Mask Histogram Generation

Let $B_I$ denote the bit depth of the input image (117) (e.g., $B_I=16$) and let $K=2^{B_I}$, then the dynamic range 0 to K−1 may be partitioned into M bins of equal pixel interval values W, that is W=K/M. In an embodiment, for the j-th frame, a noise histogram $b_j(m)$, where m denotes the m-th histogram bin (m=0, 1, 2, . . . M−1), may be generated as follows:
a) Identify all pixels in the original image ($I_{ji}$, $i \in \Omega_j$) which have pixel values in the range $$\left[ \frac{m}{M}, \frac{m+1}{M} \right).$$

b) Among those pixels, select the minimal $H_j(i)$, since, as described earlier, the masking elevation is not a 2D map. Or, given $$\Psi_{j,m} = \left\{ i \,\middle|\, \frac{m}{M} \leq I_{ji} < \frac{m+1}{M} \right\}, \quad (6)$$

$$b_j(m) = \min\{H_j(i) \mid i \in \Psi_{j,m}\}.$$

Note that sometimes certain bins may be empty, since there might not be any image pixels within the bin's pixel range. The indices of these bins may be stored and their state will be addressed later.

Adaptive PQ values may be adjusted at the frame level or at the scene level. As used herein, the terms 'scene' or 'shot' for a video sequence may relate to a series of consecutive frames in the video signal sharing similar color and dynamic range characteristics. Because of the consecutive nature of video prediction in most video compression formats, it may be preferable to adjust the quantization parameters only at boundaries that match the typical boundaries of a video encoder, such as scene changes or a new group of pictures (GOP). Thus, given a scene with F frames, and frame-based noise-masking histograms $b_j(m)$, a scene-based noise-masking histogram b(m) may be derived as $$b_m = \min\{b_j(m) | j=0,1,\ldots,F-1\}. \quad (7)$$

In an embodiment, assuming a noise upper bound of 1, noise bins for which there are no pixels values for the entire scene may be assigned the maximum possible noise level value, 1. In some embodiments, missing bins may also be interpolated from neighboring bins. For j=1, 2, . . . , F, scene-based minimum and maximum pixel values may also be generated as $$v_L = \min\{v_{Lj}\},$$

$$v_H = \max\{v_{Hj}\}. \quad (8)$$

Figure 4:
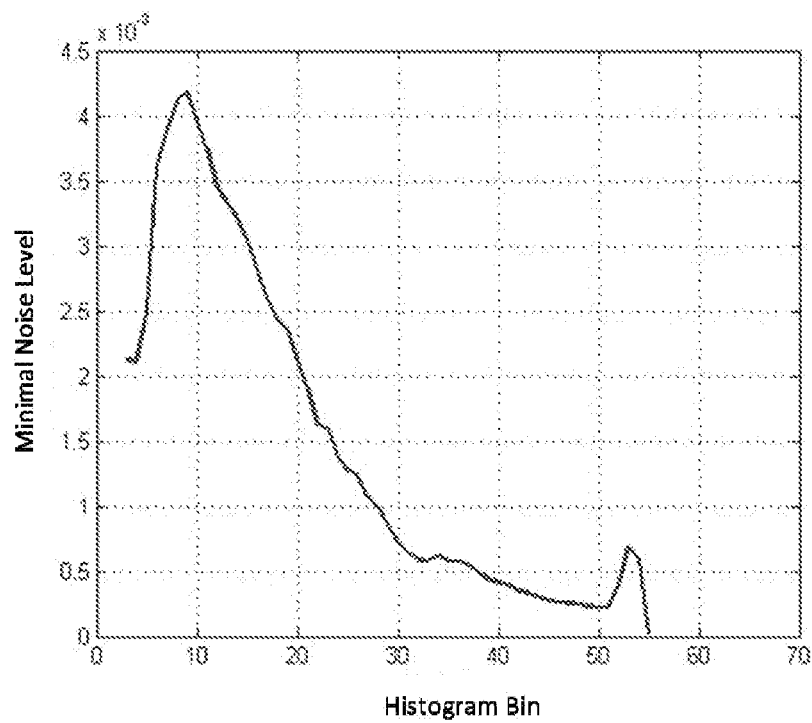
FIG. 4 depicts a scene-based noise masking histogram in accordance with example embodiments disclosed herein.

FIG. 4 depicts an example of a scene-based noise masking histogram for an HDR scene for $B_I=16$ and M=64 bins. In this example, the dark regions incorporate higher masking noise levels than the mid-tones and the highlights.

Bit Depth Per Histogram-Bin Calculation

Figure 5:
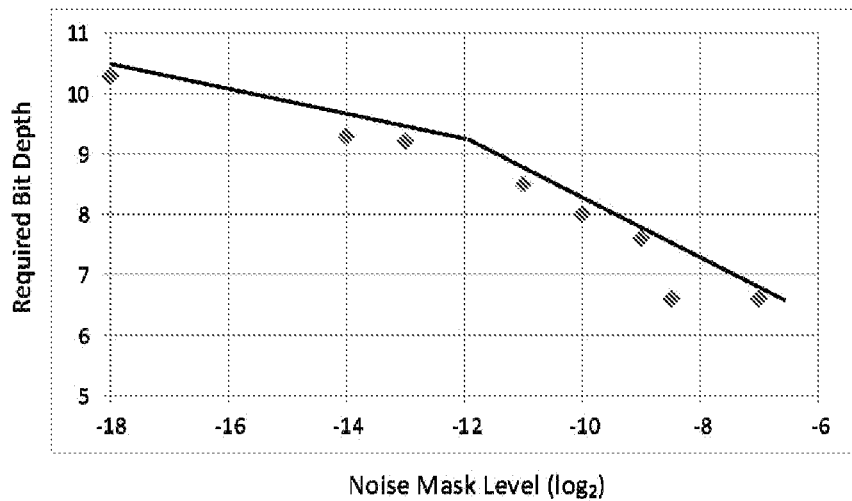
FIG. 5 depicts an example of a mapping function which maps noise-mask levels to required signal bit depth in accordance with example embodiments disclosed herein.

Given the noise level $b_m$ for each bin in the noise-mask histogram, the next step would be to determine the number of bits that need to be allocated for each bin. In an embodiment, such a mapping may be determined based on experimental user study results. For example, in one such study, users were shown to evaluate test images quantized to different bit depths, where Gaussian noise was added to the images before the quantization. As an example, FIG. 5 depicts the results of a user study using Gaussian filters with $r_L=9$ and $\sigma_L^2=3$. For example, for a noise mask level of $2^{-10}$, the required bit depth is 8 bits. As expected, FIG. 5 indicates that image regions with higher levels of mask noise can achieve full visual transparency at smaller bit depths. Alternatively, the smoother the image, the more bit depth is needed for an accurate and perceptually lossless representation.

Consider a set of data pairs $(\tilde{N}_i, \tilde{Q}_i)$ i=1, 2, 3, . . . , N, where for the i-th input noise level $\tilde{N}_i$ it has been determined (e.g., via user studies or other techniques) that the corresponding minimal bit depth is $\tilde{Q}_i$. In an embodiment, these pairs can be expressed as a masking-noise to(bit depth function $$Q_m = f_N(b_m). \quad (9)$$

For example, without limitation, using simple linear interpolation, for $\tilde{N}_n \leq b_m \leq \tilde{N}_{n+1}$, $$Q_m = \tilde{Q}_n - (\tilde{Q}_n - \tilde{Q}_{n+1}) \frac{b_m - \tilde{N}_n}{\tilde{N}_{n+1} - \tilde{N}_n}. \quad (10)$$

In an embodiment, the $Q_m = f_N(b_m)$ mapping may be computed using a look-up table. In an embodiment, it may be more convenient to perform codeword mapping (220) based on the number of required codewords within a histogram bin instead of using the bit depth data directly. This is examined in the next section.

Codeword Mapping Generation

Let $B_T$ denote the target bit depth for the re-quantized signal (152) (e.g., $B_T=10$ bits/pixel per color component), then the output will be mapped using $2^{B_T}$ codewords. In an embodiment, the range of codewords is normalized to one, hence let $$D_m = \left( \frac{2^{Q_m}}{2^{B_T}} \right) \bigg/ 2^{B_I}. \quad (11)$$

denote the number of normalized codewords per bin m. For example, if $Q_m=9$, $B_I=16$ and $B_T=10$, then $D_m=2^{-17}$.

Let $$d_i = D_m \text{ for } (m-1)W \le i < mW, \tag{12}$$

denote the number of normalized codewords per input $i \in (0, 2^{B_I}-1)$, then $d_i$ can be considered a lower bound for the number of required codewords per input codeword. The total number of normalized codewords for all input codewords, D, is bounded by 1, or $$D = \sum_{i=v_L}^{v_H} d_i \le 1. \tag{13}$$

Figure 6A:
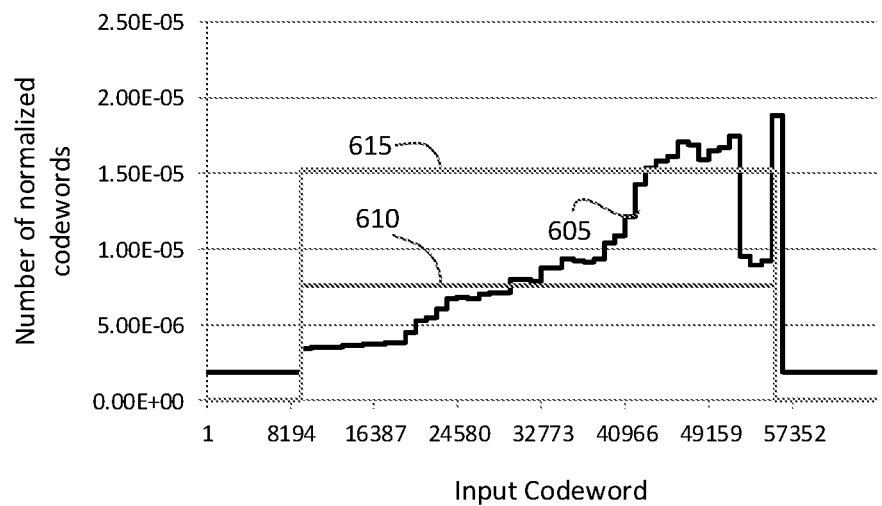
FIG. 6A and FIG. 6B depict examples of computed normalized codeword allocations in accordance with example embodiments disclosed herein.

FIG. 6A depicts an example plot of the number of normalized codewords ($d_i$ (605)) as computed for a single video frame for $B_I=16$ (input codewords range from 0 to 65535). The plot also shows the number of normalized codewords when one simply truncates from 16 bits to either the 9 most significant bits (610) or the 10 most significant bits (615). As depicted in FIG. 6A, a simple 10-bit truncation is not adequate to satisfy the bit-depth requirements for certain input pixels in the highlights range.

Let $U=1-D$ denote the number of unused normalized codewords. These unused codewords need to be reassigned to input codewords according to a given criterion. In an embodiment, without limitation, any one (or a combination thereof) of the following allocation schemes may be employed:

i) Proportional Allocation

Under this criterion, for input $v_L \le i \le v_H$ additional codewords are assigned based on the existing distribution, or $$\tilde{d}_i = d_i + U \frac{d_i}{D}, \tag{14}$$

where $\tilde{d}_i$ denotes the updated number of normalized codeword values.

ii) Constant Offset Allocation

Under this criterion, excess codewords are evenly distributed, or for input $v_L \le i \le v_H$, $$\tilde{d}_i = d_i + \frac{U}{v_H - v_L}. \tag{15}$$

iii) Histogram-Based Allocation

Let $h_i$ denote the histogram of the original input image, that is for $v_L \le i \le v_H$, $h_i=k$ denotes that out of P pixels there are k pixels with the value i. Then, under this criterion, the codewords are assigned according to the histogram values, or for input $v_L \le i \le v_H$ $$\tilde{d}_i = d_i + U \frac{h_i}{P}. \tag{16a}$$

In a variation, one may divide the input range into M sub-ranges (e.g., for M=3, blacks, mid-tones, and highlights) and compute histogram $H_m$ (m=1, 2, . . . , M) denoting the total number of input pixels within the m-th sub-range, then, for i belonging in the m-th pixel sub-range $$\tilde{d}_i = d_i + U \frac{H_m}{P}. \tag{16b}$$

iv) Scalar-Based Allocation

This can be considered a combination of the histogram-based allocation (e.g., consider a histogram with only two bins; one for darks and one for highlights) with the constant offset allocation. Let a denote a parameter between 0 and 1 denoting the relative importance of "darks" versus "highlights," then, for input $v_L \le i \le v_H$, under this criterion $$\tilde{d}_i = d_i + a\left(\frac{U}{v_H - v_L}\right) + (1-a)(i - v_L)\left(\frac{U}{v_H - v_L}\right). \tag{17}$$

If U=0, then no redistribution of codewords is possible. Under such a scenario, as will be discussed later on as well, an encoder may decide to either increase the target bit depth, add noise to the input image to effectively reduce the $d_i$ distribution, or do nothing and rely on the decoder and post-processing filtering to reduce the observable quantization noise. The remaining processing steps may operate directly on the $\tilde{d}_i$ data; however, in an embodiment, these data may be smoothed by a low pass filter, e.g., a 2N+1-tap averaging filter, for improved performance Let $\tilde{s}_i = 0$, for $i < v_L$ and $i > v_H$, and $$\tilde{s}_i = \frac{1}{2N+1} \sum_{k=-N}^{N} a_k \tilde{d}_{i+k}, \text{ otherwise,} \tag{18}$$

where $a_k$, k=−N, −N+1, . . . , N, denotes the filter coefficients of the smoothing filter $$\left(\text{e.g., } a_k = \frac{1}{2N+1}\right).$$

In an embodiment, the length of this filter is large enough to span at least the size of two consecutive bins of the noise-mask histogram (e.g., N=W). Larger filters will provide better smoothing, but require more computational power.

Figure 6B:
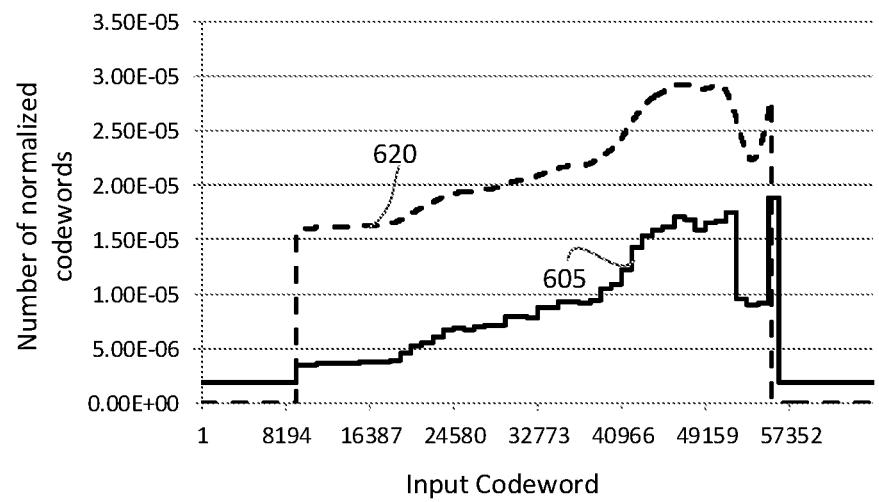

FIG. 6B depicts an example plot of $\tilde{s}_i$ data (620), representing smoothed $\tilde{d}_i$ data computed according to the constant offset allocation scheme. In some cases, the sum of $\tilde{s}_i$ values may exceed 1, hence, these values needs to be re-normalized again, as $$S = \sum_{i=v_L}^{v_H} \tilde{s}_i, \tag{19}$$

$$s_i = \frac{\tilde{s}_i}{S}.$$

Values of $s_i$ should still satisfy the lower bound constraint, namely $$s_i \ge d_i \text{ for } v_L \le i \le v_H. \tag{20}$$

Given $$FL(i) = \sum_{k=0}^{i} s_k, \tag{21}$$

then, in the j-th frame, for a given input pixel $I_{jp}=i$ ($i \in (0, 2^{B_i}-1)$) the final, normalized, re-quantized pixel value $s_{jp}$ may be expressed as:

$$s_{jp} = \begin{cases} 0, & \text{if } i < v_L \\ 1, & \text{if } i > v_H \\ FL(i), & \text{if } v_L \leq i \leq v_H \end{cases} \quad (22)$$

Figure 6C:
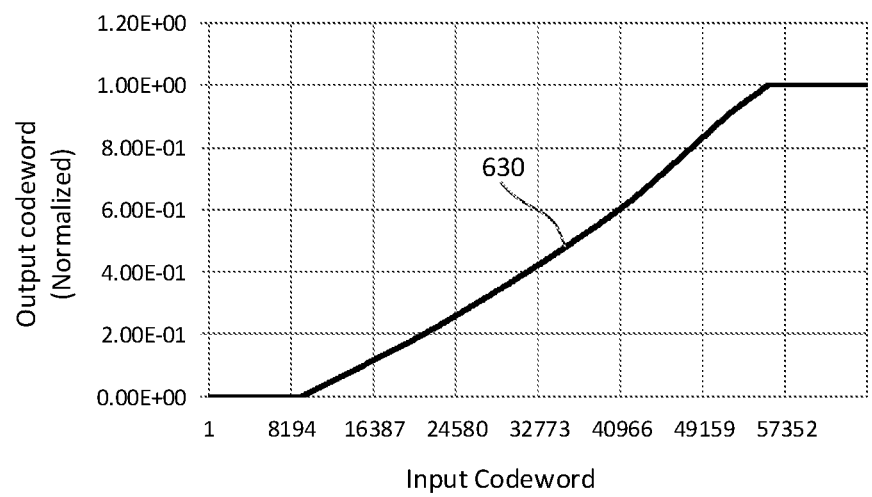
FIG. 6C depicts an example of adaptive perceptual quantization mapping in accordance with example embodiments disclosed herein.

In an embodiment, FL(i) values may be stored in a pre-computed look-up table (LUT). Alternatively, normalized $s_{jp}$ values may also be mapped to de-normalized values in the range 0 to $2^{B_T}-1$. An example of an FL(i) mapping (630), based on the (620) data is depicted in FIG. 6C.

Figure 7:
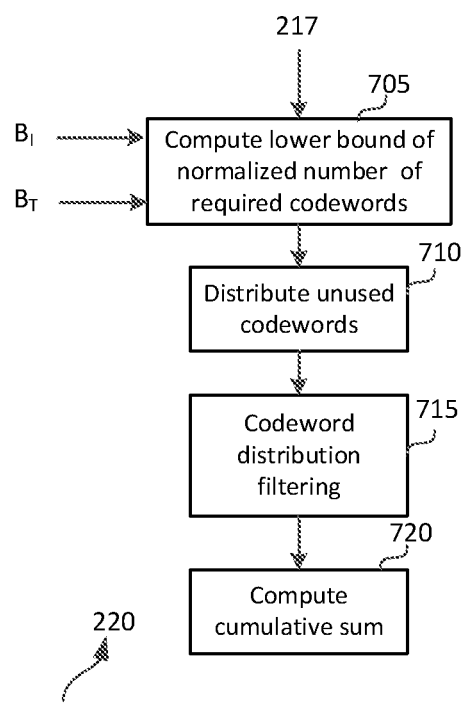
FIG. 7 depicts an example process for codeword mapping in accordance with example embodiments disclosed herein.

FIG. 7 depicts an example summary of the steps in the codeword-mapping process (220). Given as input the required bit depth per noise-histogram bin ($Q_m$) (217), the input bit depth ($B_I$) and the target bit depth ($B_T$), step (705) computes a lower bound of the normalized numbers of required codewords per input $I_{jp}=i$ according to equation (12). In step (710), any unused codewords are re-distributed according to any one of a number of redistribution schemes, for example, as described by equations (14-17). Optionally, in step (715), the redistributed data $\tilde{d}_i$ is filtered (e.g., see equation (18), to generate a smoothed, normalized number of codewords, which in step (720) is used to generate the final codeword mapping based on a cumulative-sum function.

Frame-Based Adaptive Quantization

As discussed earlier, according to equation (7), in an embodiment, adaptive quantization may be based on noise-masking histogram data collected across multiple frames in a scene. Collecting data across multiple frames may introduce significant delay which may be unacceptable in an environment when adaptive quantization needs to be performed in real-time. In another embodiment, codeword mapping (or reshaping) may be performed using data from the first frame in a scene; however, the mapping may be adjusted periodically to accommodate for small variations within the frames of the scene. Such a process is described in pseudo-code in Table 1.

TABLE 1

Frame-based Adaptive Quantization

```
// select thresholds ω,ε,and δ (small numbers, e.g., 0.3).
//
{s_-1} = {0};
v_L = K = 2^B_I;
v_H = -1;
Flag_New_LUT = 1; // Force a new codeword generation
for( j = 0 ; j < F; j ++ ) { // go through each frame
  calculate noise level {b_j,m} for frame j //See equation (6)
  obtain extreme values (v_L,j, v_H,j)
  obtain curve {d_i} for frame j // See equation (12)
  // if the required bit depth in current frame exceeds a margin in current
LUT
  // or the min or max value is outside given tolerance, then
  // we need to create a new codeword LUT
  if ((∃d_i > (1 - ω)s_i) || (v_L,j < (1 + ε)v_L) || (v_H,j > (1 - ε)v_H ) ){
  Flag_New_LUT = 1
  }
  if(Flag_New_LUT == 1) { // need to create a new LUT
    set the low extreme value with a margin v_L = max{0,(1 - δ)v_L,j}
    set the high extreme value with a margin v_H = min{K,(1 + δ)v_H,j}
    use current curve {d_i} to construct {s_i}
    construct the forward LUT {FL(i)} // see equation (21)
    Flag_New_LUT = 0
  }
}
```

Backward Reshaping

In some embodiments, backward reshaping (160) may be applied to reverse the effects of forward reshaping (150). In an embodiment, a look-up table for inverse quantization may be constructed as follows:
a) For each codeword in the quantized domain ($s_c$), identify all input codewords ($v_i$) for which $FL(v_i)=s_c$. Let this group be denoted as $\omega(s_c)=\{v_i|FL(v_i)=s_c\}$; then
b) Construct the backward reshaping function ($BL(s_c)$) as a function of $\omega(s_c)$.
For example, in an embodiment, without limitation, $BL(s_c)$ may be constructed as the average of all codewords that belong to $\omega(s_c)$, or
if $|\omega(s_c)|>0$,
then $$BL(s_c) = \frac{\sum_{i \in \omega(s_c)} v_i}{|\omega(s_c)|}, \quad (23)$$

where $|\omega(s_c)|$ denotes the number of elements in the set $\omega(s_c)$. If $|\omega(s_c)|=0$ for any $s_c$ values, in an embodiment, these values may be interpolated from its neighbor non-zero values.

ALTERNATIVE EMBODIMENTS

As described earlier, in one embodiment, the proposed adaptive quantization may be performed before a coding (compression) step (120) to accommodate bit-depth-related limitation of existing codecs. After quantization, data related to the reshaping mapping function (630) (e.g., an inverse mapping function) may be embedded as metadata (e.g., as the coefficients of a multi-segment linear or 2nd-order polynomial or as a look-up table) to allow a decoder to perform the inverse mapping. Alternatively, if there is no satisfactory reshaping function that can operate within the target bit-depth limits, in an embodiment, noise or dithering as known in the art may be added to the original smooth areas of the image to improve the masking of the quantization errors. Such noise may be added according to the output of the noise mask histogram generation step (210).

In some embodiments, the content-based perceptual quantization process may be further adapted and adjusted according to information received by a decoder. For example, if a downstream device is attached to a display with sensors for measuring the intensity of ambient light or the viewing distance, such information can be sent upstream to the encoder to adjust either the filters for noise mask generation (205) or other parameters of the adaptive quantization process (e.g., the redistribution step). For example, for high ambient light, fewer quantization steps are needed in the dark areas.

In some embodiments, instead of performing noise injection or dithering at the encoder stage, this operation may be performed in the decoder based on metadata information sent by the encoder (e.g., the noise mask histogram).

As would be appreciated by people having ordinary skills in the art of image processing, the proposed content-adaptive quantization techniques may be applicable to variety of other image processing applications which reduce the bit depth requirements by applying additive noise, dithering, or bit truncation.

Real-Time Reshaping

Figure 8A:
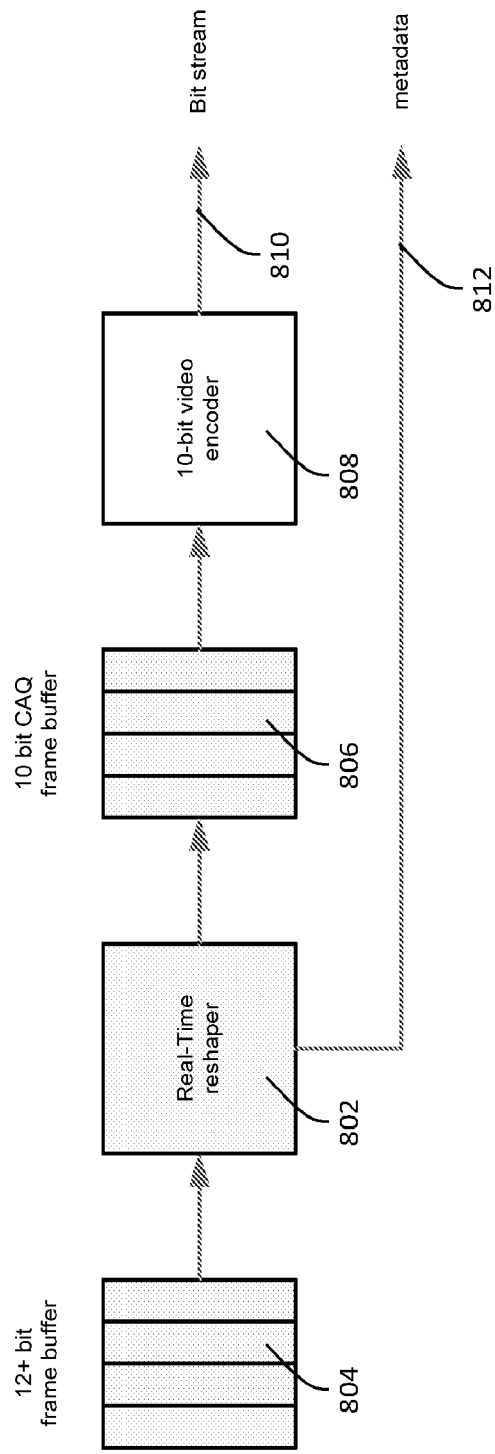
FIG. 8A depicts an example real-time reshaper in accordance with example embodiments disclosed herein.

FIG. 8A depicts an example real-time reshaper 802 that receives an input video signal of an input bit depth and performs real-time reshaping operations on images decoded from the input video to generate reshaped images that are encoded into an output video signal of an output bit depth. As used herein, real-time reshaping operations may refers to reshaping operations (e.g., reshaping an input image into a reshaped image, etc.) that are completed within a specific time constraint (e.g., up to a tolerant delay, up to 20 milliseconds, up to 100 milliseconds, within two video frames, within five video frames, etc.).

The output video signal may represent a reshaped video signal, a content adaptive PQ (CAQ) video signal, or the like. In some embodiments, an input image (e.g., taken by camera, captured from a scene in real time, a video signal generated at a real time event, real-time video of a conference call, etc.) decoded from the input video signal may be buffered in a 12+ bit frame buffer 804.

In some embodiments, the input image is in a target perceptual quantized (PQ) color space (e.g., IPT-PQ, etc.). In response to determining that the input image (or the input video signal from which the input image is decoded) is in the target PQ colors pace, the real-time reshaper (802) performs reshaping operations on the input image in the target PQ color space to generate a corresponding reshaped image.

In some other embodiments, the input image is not in the target perceptual quantized (PQ) color space (e.g., IPT-PQ, etc.). In response to determining that the input image (or the input video signal from which the input image is decoded) is not in the target colors pace, and/or in response to determining that the input image is not perceptually quantized (e.g., with a PQ-related EOTF, etc.), the real-time reshaper (802) converts the input image into an intermediate image in a target perceptual quantized (PQ) color space (e.g., IPT-PQ, etc.). The real-time reshaper (802) then performs reshaping operations on the intermedia image in the target PQ color space to generate a corresponding reshaped image.

The reshaped image (e.g., of an output bit depth lower than an input bit depth of the input image, etc.) generated by reshaping operations as described herein may be buffered in a 10 bit CAQ frame buffer 806, which may be fetched and encoded by a video encoder into the output video signal such as a bit stream 810.

Information relating to the reshaping operations performed by the real time reshaper (802) may be embedded in the output video signal as metadata 812. The metadata (812) comprising the information relating to the reshaping operations may be transmitted as part of an overall coded bitstream that includes the bitstream (810) encoded with the reshaped images. In some embodiments, the bitstream (810) and the metadata (812) may be carried in the same bitstreams that carry image data (e.g., pixel values, encoded or compressed image data, etc.). Additionally, optionally, or alternatively, the bitstream (810) and the metadata (812) may be carried in separate bitstreams that are multiplexed in the overall coded bitstream.

Challenges for real-time reshaping operations may come from scenes that are highly dynamic. In some implementations, real time reshaping operations depend at least partly on statistics that are derived from image content of each input image (or frame). The statistics may be per image statistics of luma values, chroma values, etc., in each input image. As per-image statistics derived from content of each such image may be different, different reshaping curves/functions may be used to reshape the image into an output image in the output video signal. This makes video compression inefficient, as the per-image statistics vary from image to image. More specifically, highly frequent changes in reshaping curves/functions, mismatches at scene changes (or cuts), etc., may result in low compression efficiency.

In some embodiments, CAQ reshaping operations may be scene-based to facilitate video compression (e.g., for temporal consistency, for motion compensation, etc.). In some implementations, real time reshaping operations may depend at least partly on per-scene statistics that are derived from image content of input images in a scene. However, as per-scene statistics derived from content of the images of the scene may be different from per-image statistics derive from an individual input image in the scene, an overly stable reshaping curve/function based on per-scene statistics may cause false contouring artifacts in individual input images in the scene. For example, a scene may contain extremely bright (or very smooth areas in one sub-range of a dynamic range) in some images and extremely dark (or very smooth areas in another sub-range of the dynamic range) in some other images. If an overall reshaping curve/function for the scene is not updated for most or all images of the scene in a long time period, the overall reshaping curve/function for the scene may not adequately cover both sub-ranges at opposing ends of a very large dynamic range. As a result, false contouring artifacts may occur in reshaped images using an overall reshaping curve/function based on the per-scene statistics.

Techniques as described herein may be used to maintain a good balance between temporal stability (in statistics and reshaping functions/curves) for efficient compression and dynamic adaptation (to changing statistics) for avoiding false contouring artifacts in real-time reshaping functions. These techniques can also be used to complete reshaping an input image into a reshaped image within a (e.g., fixed, configured, designed, etc.) tolerant delay such as a zero-frame delay, a few-frame delay, etc., depending on specific applications. In an example, in a video conferencing application, a relatively smaller number such as equivalent to a time delay of less than 100 milliseconds, 50 milliseconds, etc., may be set for the number of subsequent input images (or a correspondingly small look-ahead frame buffer may be used to hold the subsequent images). In another example, in a video multicast or broadcast application, a relatively large number, a relatively larger number such as equivalent to a time delay of larger than 3 seconds, 2 seconds, 1 second, 100 milliseconds, 50 milliseconds, etc., may be set for the number of subsequent input images (or a correspondingly large look-ahead frame buffer may be used to hold the subsequent images).

As used herein, (real time) CAQ reshaping with zero-frame delay may mean that an input image is reshaped into a reshaped image (in real time) within a (e.g., strict, relatively small, etc.) time limit for processing and transmission delay without depending on content information in any subsequent input images that follow the input image in an input video signal. The real-time CAQ reshaping with zero-frame delay may comprise reading in a current input image, past input images of the same scene before the current input image, and outputting a corresponding current reshaped image, without requiring reading in subsequent input images (e.g., of the same scene, a different scene, etc.) after the current input image. Statistics and/or reshaping curves/functions referred to by the real-time CAQ with zero-frame delay are derived from the current input image and the past input images.

In contrast, (real time) CAQ reshaping with few-frame delay may mean that an input image is reshaped into a reshaped image within a (e.g., strict, larger than a time limit of a zero frame delay, etc.) time limit for processing and transmission delay in addition to depending on content information of (thus incurring a wait time of) up to a certain number (e.g., two, five, etc.) of subsequent input images that follow the input image in an input video signal. few-frame delay: The real-time CAQ reshaping with few-frame delay may comprise reading in a current input image and past input images of the same scene before the current input image in addition to reading in up to a certain number of subsequent input images (e.g., in a look-ahead frame buffer, etc.) of the same scene after the current input image, and outputting a corresponding current reshaped image. The number of subsequent input images may depend on specific applications, and may subject to a scene change constraint. Statistics and/or reshaping curves/functions referred to by the real-time CAQ with few-frame delay are derived from the current input image, the past input images, and up to the certain number of subsequent input images. The look-ahead approach may cause a delay of at least a few frames in overall video signal reshaping operations.

Figure 9:
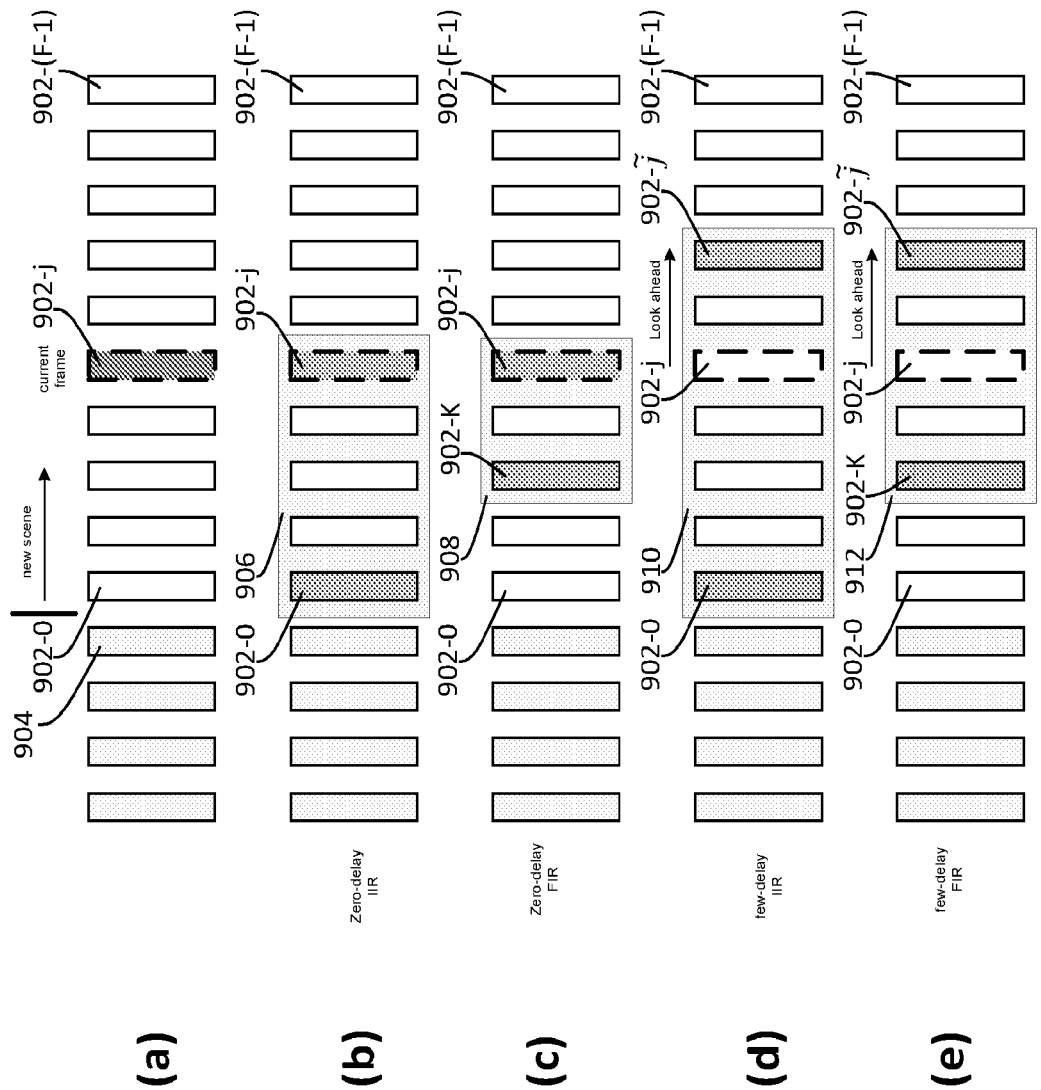
FIG. 9 depicts example approaches in reshaping an input video signal in accordance with example embodiments disclosed herein.

FIG. 9 depicts example approaches in reshaping an input video signal. As illustrated in FIG. 9 (a), a sequence of input images (or frames) may comprise a current scene that begins at a first input image 902-0 of the current scene and ends at a last input image 902-(F−1) of the current scene, where F is a positive integer. The first input image (902-0) represents a scene change between two different scenes, namely from a previous scene (which ends at a previous last image 904) to the current scene. The current scene comprise a current image or frame 902-j, where j is an integer between 0 and F−1.

For the purpose illustration, the target PQ color space in which reshaping operations are performed is an IPT-PQ color space. Denote the $p^{th}$ pixel in I, P, T channels (in the IPT-PQ color space in the present example) of the $j^{th}$ input image of the current scene as $I_j(p)$, $P_j(p)$, and $T_j(p)$, respectively. The minimal and maximal values in the $j^{th}$ input image for I channel (or luma) are denoted as $v_{L,j}$ and $v_{H,j}$, respectively; the minimal and maximal values in the $j^{th}$ input image for P channel (or P chroma channel) are denoted as $v_{L,j}^P$ and $v_{H,j}^P$, respectively; the minimal and maximal values in the $j^{th}$ input image for T channel (or T chroma channel) are denoted as $v_{L,j}^T$ and $v_{H,j}^T$, respectively, as shown in the following expressions:

$$v_{L,j} = \min\{I_j(p)\}$$

$$v_{H,j} = \max\{I_j(p)\}$$

$$V_{L,j}^P = \{P^j(p)\}$$

$$V_{H,j}^P = \max\{P^j(p)\}$$

$$V_{L,j}^T = \min\{T_j(p)\}$$

$$V_{H,j}^T = \max\{T_j(p)\} \tag{24}$$

For I channel, let $B_I$ denote the bit depth of an input image such as the $j^{th}$ input image (e.g., $B_I$=16) and let K=$2^{B_I}$ (e.g., K=65536), then the dynamic range 0 to K−1 may be partitioned into M bins of equal luminance (or luma) interval values W, that is W=K/M.

A group value such as a minimum noise level, a mean noise level, etc., in each bin may be determined for an input image based on pixel values in each such bin of the input image. For example, pixels ($I_j(i)$, $i \in \Omega_j$) in the $j^{th}$ input image that have pixel values in the range $$\left[\frac{m}{M}, \frac{m+1}{M}\right)$$

for the $m^{th}$ bin (where m=0, 1, . . . , M−1) can be identified first. Among these identified pixels in the $m^{th}$ bin, the minimum noise level $b_{j,m}$ and the mean noise level $a_{j,m}$ may be computed as follows:

$$b_{j,m} = \min\{H_j(i) \mid i \in \Psi_{j,m}\} \tag{25}$$

$$a_{j,m} = \text{mean}\{H_j(i) \mid i \in \Psi_{j,m}\} \tag{26}$$

where $$\Psi_{j,m} = \left\{i \mid \frac{m}{M} \leq I_j(i) < \frac{m+1}{M}\right\}.$$

Zero-Frame Delay—Growing Window

FIG. 9 (b) illustrates example CAQ reshaping with zero-frame delay under a growing window approach ("zero-delay IIR"). In this case, the minimal noise level $b_m^{(j)}$ from the first image (902-0) of the scene to the current image (902-j) of the scene in a growing window 906 may be computed for each bin m as follows:

$$b_m^{(j)} = \min\{b_{f,m} | f=0,1, \ldots j\} \tag{27}$$

From the first image (902-0) of the scene to the current image (902-j) of the scene, the minimal and maximal values (denoted as $v_L^{(j)}$ and $v_H^{(j)}$) for I channel (or luma), the minimal and maximal values (denoted as $v_L^{P,(j)}$ and $v_H^{P(j)}$) for P channel (or P chroma channel), and the minimal and maximal values (denoted as $v_L^{T,(j)}$ and $v_H^{T(j)}$) for T channel (or T chroma channel) may be computed as follows:

$$v_L^{(j)} = \min\{v_{L,f} | f=0,1, \ldots j\}$$

$$v_H^{(j)} = \max\{v_{H,f} | f=0,1, \ldots j\}$$

$$v_L^{P,(j)} = \min\{v_{L,f}^P | f=0,1, \ldots j\}$$

$$v_H^{P(j)} = \max\{v_{H,f}^P | f=0,1, \ldots j\}$$

$$v_L^{T,(j)} = \min\{v_{L,f}^T | f=0,1, \ldots j\}$$

$$v_H^{T(j)} = \max\{v_{H,f}^T | f=0,1, \ldots j\} \tag{28}$$

Given the noise level $b_m^{(j)}$ for each bin in the noise-mask histogram, the number of bits that need to be allocated and the number of normalized codewords per bin m can be determined based on a masking-noise to bit depth function as follows:

$$Q_m^{(j)} = f(b_m^{(j)}) \tag{29}$$

$$D_m^{(j)} = \left(\frac{2^{Q_m^{(j)}}}{2^{B_r}}\right) / 2^{B_I} \tag{30}$$

where $B_I$ denotes the pre-reshaped bit depth for the I channel of the pre-reshaped signal (e.g., an input image or an intermediate image in the frame buffer (804)), whereas $B_T$ denotes the target (or reshaped) bit depth for the I channel of the reshaped signal (e.g., the I channel of 810 of FIG. 8A).

In some embodiments in which the pre-reshaped signal is inputted in (or converted into) the IPT-PQ color space, $B_I$ may be one of 16 bits/pixel, 12+ bits/pixel, etc., for the I channel of the IPT-PQ color space, whereas $B_T$ may be one of 10 bits/pixel, 8 bits/pixel, etc., for the I channel of the IPT-PQ color space.

Let $$d_i^{(j)} = D_m^{(j)} \text{ for } (m-1)W \le i < mW, \quad (31)$$

denote the number of normalized codewords per input $i \in (0, 2^{B_I}-1)$ in an input dynamic range (e.g., EDR) of the pre-reshaped signal (or input video signal), then $d_i^{(j)}$ can be considered a lower bound for the number of required codewords per input codeword. The total number of normalized codewords for all input codewords, $D^{(j)}$, is bounded by 1, or $$D^{(j)} = \sum_{i=v_L}^{v_H} d_i^{(j)} \le 1. \quad (32)$$

In some embodiments, unused codeword space, $U^{(j)}=1-D^{(j)}$, may be distributed in one of a variety of ways to each normalized codeword $d_i^{(j)}$. In a non-limiting example, a constant may be derived from the unused codeword space, $U^{(j)}$, and distributed to all normalized codewords $\{d_i^{(j)}\}$ as follows:

$$\tilde{d}_i^{(j)} = d_i^{(j)} + \frac{U^{(j)}}{v_H^{(j)} - v_L^{(j)}} \text{ for } v_L^{(j)} \le i \le v_H^{(j)} \quad (33)$$

In an embodiment, the new normalized words $\tilde{d}_i^{(j)}$ may be smoothed by a low pass filter, e.g., a 2N+1-tap averaging filter, for improved performance.

Let $$\tilde{s}_i = 0 \text{ for } i < v_L^{(j)} \text{ and } i > v_H^{(j)} \quad (34)$$

and $$\tilde{s}_i^{(j)} = \sum_{k=-N}^{N} a_k \cdot \tilde{d}_{i+k}^{(j)} \text{ where } a_k = \frac{1}{2N+1} \text{ otherwise,} \quad (35)$$

where $a_k$, $k=-N, -N+1, N$, denotes the filter coefficients of the smoothing filter $$\left(\text{e.g., } a_k = \frac{1}{2N+1}\right).$$

In an embodiment, the length of this filter (2N+1) is large enough to span at least the size of two consecutive bins of the noise-mask histogram (e.g., N=W).

In some cases, the sum of $\tilde{s}_i^{(j)}$ values may exceed 1 (which may mean the total required codewords exceeds our maximal bit depth capacity in the target video signal or reshaped video signal), hence, these values can be re-normalized again, as $$s_i^{(j)} = \frac{\tilde{s}_i^{(j)}}{S^{(j)}} \text{ where } S^{(j)} = \sum_{i=v_L}^{v_H} \tilde{s}_i^{(j)} \quad (36)$$

A reshaping curve/function $FL^{(j)}(i)$ for I channel for the current image (902-j) of the scene may be generated or defined based on $\{s_i^{(j)}\}$ as follows:

$$FL^{(j)}(i) = \sum_{k=0}^{i} s_i^{(j)}, \quad (37)$$

then, in the j-th frame, for a given input pixel value for I channel, $I_{jp}=i$ ($i \in (0, 2^{B_I}-1)$), the (e.g., final, reshaped, re-quantized, etc.) normalized pixel values or code words for I channel, $s_{jp}$, may be expressed as:

$$s_{jp} = \begin{cases} 0, & \text{if } i < v_L^{(j)} \\ 1, & \text{if } i > v_H^{(j)} \\ FL^{(j)}(i), & \text{if } v_L^{(j)} \le i \le v_H^{(j)} \end{cases} \quad (38)$$

The target (or reshaped) bit depths for the P and channels of the target (or reshaped) signal (e.g., the P and T channels of 810 of FIG. 8A) may be denoted as BL_bitdepth (or base layer bit depth). The target bit depths for the P and channels, BL_bitdepth, may be the same as the target bit depth (e.g., $B_T$) for the I channel of the target signal (810) in some embodiments, or may be different from the target bit depth (e.g., $B_T$) for the I channel of the target signal (810) in some other embodiments. In some embodiments, BL_bitdepth may be one of 10 bits/pixel, 8 bits/pixel, etc., for the P and T channels of the target signal (810).

The mid-range of available pixel values or codewords for each of P and T channels for the target signal (810) and the maximum pixel value or codeword for each of P and T channels for the target signal (810) may be defined as follows:

$$\text{mid\_range} = 2^{BL\_bitdepth} - 1 \quad (39)$$

$$\text{max\_LD\_value} = 2^{BL\_bitdepth} - 1 \quad (40)$$

In some embodiments, chroma reshaping functions (used to reshape codewords for the P and T channels of the pre-reshaped signal into reshaped chroma codewords for the P and T channels of the target signal (810)), denoted as $Q_{BL}^{P(j)}$ and $Q_{BL}^{T(j)}$, may be constructed as linear relationships as follows:

$$\tilde{P}_j(p) = Q_{BL}^{P(j)}(P_j(p)) = \quad (41)$$

$$clip3\left(\left\lfloor w^P \left(\frac{C_H^I - C_L^I}{v_H^{(j)} - v_L^{(j)}}\right)\left(P_j(p) - \frac{v_L^{P(j)} + v_H^{P(j)}}{2}\right) + \text{mid\_range} + 0.5\right\rfloor,\right.$$
$$\left. 0, \text{max\_LD\_value}\right)$$

$$\tilde{T}_j(p) = Q_{BL}^{T(j)}(T_j(p)) = \quad (42)$$

$$clip3\left(\left\lfloor w^T \frac{C_H^I - C_L^I}{v_H^{(j)} - v_L^{(j)}}\left(T_j(p) - \frac{v_L^{T(j)} + v_H^{T(j)}}{2}\right) + \text{mid\_range} + 0.5\right\rfloor,\right.$$
$$\left. 0, \text{max\_LD\_value}\right)$$

where min_value and max_value represents the lower and upper limits of a chroma codeword range (e.g., a range of codewords for the P channel, a range of codewords for the T channels, etc.). In some embodiments, min_value may be zero, whereas max_value may be max_LD_value.

In some embodiments (e.g., a reshaped signal traverses through an HD-SDI link, etc.), certain values in the range from zero (0) to max_LD_value may be reserved, for example, for protocol operations, for framing bits in (e.g., HD-SDI, etc.) data communication, etc. In those embodiments, one or both of the min_value and max_value in expressions (41) and expressions (42) may be set to different values other than one or both of 0 and max_LD_value, respectively. For example, min_value may be set to four (4) instead of zero (0). Similarly, codewords for the I channel can also start or end at different values other than 0 or max_LD_value Zero-Frame Delay—Sliding Window FIG. 9 (c) illustrates example CAQ reshaping with zero-frame delay under a sliding window approach ("zero-delay FIR"). In this case, the minimal noise level $b_m^{(j)}$ from the K-th image (902-0) of the scene in FIG. 9 (a) to the current image (902-j) of the scene in a sliding window 908 may be computed for each bin m as follows:

$$b_m^{(j)} = \min\{b_{f,m} | f = K, K+1, \ldots j\} \quad (43)$$

$$K = \min(j-L+1, 0) \quad (44)$$

where L is the size of the sliding window.

Note that there may be fewer images at the beginning of the scene than the size L of the sliding window until the first L images of the scene are available. In some embodiments, only available images up to the j-th image are used to compute the parameters in expression (42) above and (44) below, when j is less than L−1.

From the K-th image (902-0) of the scene in FIG. 9 (a) to the current image (902-j) of the scene, the minimal and maximal values (denoted as $v_L^{(j)}$ and $v_H^{(j)}$) for I channel (or luma), the minimal and maximal values (denoted as $v_L^{P,(j)}$ and $v_H^{P(j)}$) for P channel (or P chroma channel), and the minimal and maximal values (denoted as $v_L^{T,(j)}$ and $v_L^{T(j)}$) for T channel (or T chroma channel) may be computed as follows:

$$v_L^{(j)} = \min\{v_{L,f} | f = K, K+1, \ldots j\}$$

$$v_H^{(j)} = \max\{v_{H,f} | f = K, K+1, \ldots j\}$$

$$v_L^{P,(j)} = \min\{v_{L,f}^P | f = K, K+1, \ldots j\}$$

$$v_H^{P(j)} = \max\{v_{H,f}^P | f = K, K+1, \ldots j\}$$

$$v_L^{T,(j)} = \min\{v_{L,f}^T | f = K, K+1, \ldots j\}$$

$$v_H^{T(j)} = \max\{v_{H,f}^T | f = K, K+1, \ldots j\} \quad (45)$$

The minimal noise level $b_m^{(j)}$, the minimal and maximal values ($v_L^{(j)}$ and $v_H^{(j)}$) for I channel, the minimal and maximal values ($v_L^{P,(j)}$ and $v_H^{P(j)}$) for P channel, and the minimal and maximal values ($v_L^{T,(j)}$ and $v_H^{T(j)}$) for T channel may be used to derive reshaping curves/functions such as illustrated by expressions (28) through (41) above.

Few-Frame Delay—Growing Window

FIG. 9 (d) illustrates example CAQ reshaping with few-frame delay under a growing window approach ("few-delay IIR"). In this case, the minimal noise level $b_m^{(j)}$ from the first image (902-0) of the scene in FIG. 9 (a) to a look-ahead image (e.g. up to the lesser of the (j+A)-th image of the scene and the last image 902-(F−1) of the scene) of the scene in a growing window 910 may be computed for each bin m as follows:

$$b_m^{(j)} = \min\{b_{f,m} | f = 0, 1, \ldots \min\{j+A, F-1\}\} \quad (46)$$

From the first image (902-0) of the scene in FIG. 9 (a) to the look-ahead image of the scene, the minimal and maximal values (denoted as $v_L^{(j)}$ and $v_H^{(j)}$) for I channel (or luma), the minimal and maximal values (denoted as $v_L^{P,(j)}$ and $v_H^{P(j)}$) for P channel (or P chroma channel), and the minimal and maximal values (denoted as $v_L^{T,(j)}$ and $v_H^{T(j)}$) for T channel (or T chroma channel) may be computed as follows:

$$v_L^{(j)} = \min\{v_{L,f} | f = 0, 1, \ldots \min\{j+A, F-1\}\}$$

$$v_H^{(j)} = \min\{v_{H,f} | f = 0, 1, \ldots \min\{j+A, F-1\}\}$$

$$v_L^{P,(j)} = \min\{v_{L,f}^P | f = 0, 1, \ldots \min\{j+A, F-1\}\}$$

$$v_H^{P(j)} = \min\{v_{H,f}^P | f = 0, 1, \ldots \min\{j+A, F-1\}\}$$

$$v_L^{T,(j)} = \min\{v_{L,f}^T | f = 0, 1, \ldots \min\{j+A, F-1\}\}$$

$$v_H^{T(j)} = \min\{v_{H,f}^T | f = 0, 1, \ldots \min\{j+A, F-1\}\} \quad (47)$$

The minimal noise level $b_m^{(j)}$, the minimal and maximal values ($v_L^{(j)}$ and $v_H^{(j)}$) for I channel, the minimal and maximal values ($v_L^{P,(j)}$ and $v_H^{P(j)}$) for P channel, and the minimal and maximal values ($v_L^{T,(j)}$ and $v_H^{T(j)}$) for T channel may be used to derive reshaping curves/functions such as illustrated by expressions (28) through (41) above.

Few-Frame Delay—Sliding Window

FIG. 9 (e) illustrates example CAQ reshaping with few-frame delay under a growing window approach ("few-delay FIR"). In this case, the minimal noise level $b_m^{(j)}$ from the K-th image (902-K) of the scene in FIG. 9 (a) to a look-ahead image (e.g. up to the lesser of the (j+A)-th image of the scene and the last image 902-(F−1) of the scene) of the scene in a sliding window 912 may be computed for each bin m as follows:

$$b_m^{(j)} = \{b_{f,m} | f = K, K+1, \ldots, j, \ldots \tilde{j}\} \quad (48)$$

$$K = \min(j-L+1, 0) \quad (49)$$

$$\tilde{j} = \min\{j+A, F-1\} \quad (50)$$

From the K-th image (902-K) of the scene in FIG. 9 (a) to the look-ahead image of the scene, the minimal and maximal values (denoted as $v_L^{(j)}$ and $v_H^{(j)}$ for I channel (or luma), the minimal and maximal values (denoted as $v_L^{P,(j)}$ and $v_H^{P(j)}$) for P channel (or P chroma channel), and the minimal and maximal values (denoted as $v_L^{T,(j)}$ and $v_H^{T(j)}$) for T channel (or T chroma channel) may be computed as follows:

$$v_L^{(j)} = \min\{v_{L,f} | f = K, K+1, \ldots, j, \ldots \tilde{j}\}$$

$$v_H^{(j)} = \min\{v_{H,f} | f = K, K+1, \ldots, j, \ldots \tilde{j}\}$$

$$v_L^{P,(j)} = \min\{v_{L,f}^P | f = K, K+1, \ldots, j, \ldots \tilde{j}\}$$

$$v_H^{P(j)} = \min\{v_{H,f}^P | f = K, K+1, \ldots, j, \ldots \tilde{j}\}$$

$$v_L^{T,(j)} = \min\{v_{L,f}^T | f = K, K+1, \ldots, j, \ldots \tilde{j}\}$$

$$v_H^{T(j)} = \min\{v_{H,f}^T | f = K, K+1, \ldots, j, \ldots \tilde{j}\} \quad (51)$$

The minimal noise level $b_m^{(j)}$, the minimal and maximal values ($v_L^{(j)}$ and $v_H^{(j)}$) for I channel, the minimal and maximal values ($v_L^{P,(j)}$ and $v_H^{P(j)}$) for P channel, and the minimal and maximal values ($v_L^{T,(j)}$ and $v_H^{T(j)}$) for T channel may be used to derive reshaping curves/functions such as illustrated by expressions (28) through (41) above.

Alternative Real-Time Reshaping Embodiments

Reshaping curves/functions as derived using the worst case (or the overall minimum) of noise level measurements/computations across all the images in one of a growing window or a sliding window as illustrated in expressions (27), (43), (46) and (48) may be too conservative (e.g., over-allocating code words). In some embodiments, alternative noise level measurements/computations that are less conservative may be used for the derivation of reshaping curves/functions. In an example, non-minimum values of noise level measurements/computations (e.g., in non-current image frames) may be used. Additionally, optionally, or alternatively, values computed from different images within a growing window or a sliding window may be assigned to different weight factors, instead of the same weight factor. In some embodiments, values computed from images relatively close to the current image in the growing window or sliding window may be given a relative large weight factors than other values computed from other images relatively far away from the current image in the growing window or sliding window.

For instance, in zero-frame reshaping operations under a sliding window approach ("the zero-delay FIR"), the minimal noise level in the current image may be used as an input in determining an overall noise level of the sliding window for the current image to avoid or reduce banding artifact. Additionally, optionally, or alternatively, the mean value (expression (26)) in other images may be used as another input in determining the overall noise level of the sliding window for the current image, as follows:

$$b_m^{(j)} = \min\{\{a_{f,m}|f=K,K+1,\ldots,j-1\} \cup \{b_{j,m}\}\} \quad (52)$$

Like non-minimum noise level, non-extreme values (e.g., in non-current images) may be used to compute reshaping parameters other than the noise level. For example, each of the minimal value $v_L^{(j)}$ for I channel (or luma), the minimal value $v_L^{P,(j)}$ for P channel (or P chroma channel), and the minimal value $v_L^{T,(j)}$ for T channel may be computed as the lesser of the minimal value of the same type in the current image and the mean value of the same type in the minimal values of all non-current images in the sliding window. Similarly, each of the maximal value $v_H^{(j)}$ for I channel (or luma), the maximal value $v_H^{P(j)}$ for P channel (or P chroma channel), and the maximal value $v_H^{T(j)}$ for T channel (or T chroma channel) may be computed as the larger of the maximal value of the same type in the current image and the mean value of the same type in the maximal values of all non-current images in the sliding window.

In some embodiments, the minimal and maximal values ($v_L^{(j)}$ and $v_H^{(j)}$) for I channel, the minimal and maximal values ($v_L^{P,(j)}$ and $v_H^{P(j)}$) for P channel, and the minimal and maximal values ($v_L^{T,(j)}$ and $v_H^{T(j)}$) for T channel may be computed with expressions as follows:

$$v_L^{(j)} = \min\{OP(\{v_{L,f}|f=K,K+1,\ldots,j-1\}) \cup \{v_{L,j}\}\}$$

$$v_H^{(j)} = \min\{OP(\{v_{H,f}|f=K,K+1,\ldots,j-1\}) \cup \{v_{H,j}\}\}$$

$$v_L^{P,(j)} = \min\{OP(\{v_{L,f}^P|f=K,K+1,\ldots,j-1\}) \cup \{v_{L,j}^P\}\}$$

$$v_H^{P(j)} = \min\{OP(\{v_{H,f}^P|f=K,K+1,\ldots,j-1\}) \cup \{v_{H,j}^P\}\}$$

$$v_L^{T,(j)} = \min\{OP(\{v_{L,f}^T|f=K,K+1,\ldots,j-1\}) \cup \{v_{L,j}^T\}\}$$

$$v_H^{T(j)} = \min\{OP(\{v_{H,f}^T|f=K,K+1,\ldots,j-1\}) \cup \{v_{H,j}^T\}\} \quad (53)$$

where OP may be mean value operators (or group value operators of other types) that generate means (or group values of the other types) from their respective sets of operand values.

Subsequently, the reshaping parameters computed at least in part based on non-extreme values may be used to derive reshaping curves/functions such as illustrated by expressions (28) through (41) above.

It has been described that reshaping parameters such as noise levels may be computed based on pixel values of pre-reshaped images for the purpose of generating reshaping functions/curves. It should be noted that in various embodiments, other reshaping parameters may be used in addition to or in place of some or all of reshaping parameters as described herein.

For example, in a growing window or a sliding window, instead of maintaining/storing/caching noise levels (e.g., minimal noise levels $b_m$, mean noise levels $a_m$, etc.), required bit depths (e.g., the number of bits that need to be allocated $Q_m$, etc.) to which the noise levels may be (e.g., one-to-one, etc.) mapped may be maintained/stored/cached with a growing window or a sliding window as described herein. Instead of or in addition to using the noise levels (e.g., as floating-point values, etc.) in the growing window or sliding window to derive real-time reshaping functions/curves, the required bit depths (e.g., as integer values, etc.) in the growing window or sliding window may be used to derive real-time reshaping functions/curves as described herein.

Additionally, optionally, or alternatively, in a growing window or a sliding window, instead of maintaining/storing/caching noise levels (e.g., minimal noise levels $b_m$, mean noise levels $a_m$, etc.), a number of normalized codewords per bin (e.g., $D_m$, etc.) derived from the noise levels may be maintained/stored/cached with a growing window or a sliding window as described herein. Instead of or in addition to using the noise levels (e.g., as floating-point values, etc.) in the growing window or sliding window to derive real-time reshaping functions/curves, the number of normalized codewords per bin (e.g., as integer values, etc.) in the growing window or sliding window may be used to derive real-time reshaping functions/curves as described herein.

In another example, in a growing window or a sliding window, instead of maintaining/storing/caching noise levels (e.g., minimal noise levels $b_m$, mean noise levels $a_m$, etc.), a number of normalized codewords per input $i \in (0, 2^{B_I}-1)$ (e.g., $d_i$, etc.) derived from the noise levels may be maintained/stored/cached with a growing window or a sliding window as described herein. Instead of or in addition to using the noise levels (e.g., as floating-point values, etc.) in the growing window or sliding window to derive real-time reshaping functions/curves, the number of normalized codewords per input $i \in (0, 2^{B_I}-1)$ (e.g., as integer values, etc.) in the growing window or sliding window may be used to derive real-time reshaping functions/curves as described herein.

In a further example, in a growing window or a sliding window, instead of maintaining/storing/caching noise levels (e.g., minimal noise levels $b_m$, mean noise levels $a_m$, etc.), a smoothened number of normalized codewords per input $i \in (0, 2^{B_I}-1)$ (e.g., $s_i$, etc.) derived from the noise levels may be maintained/stored/cached with a growing window or a sliding window as described herein. Instead of or in addition to using the noise levels (e.g., as floating-point values, etc.) in the growing window or sliding window to derive real-time reshaping functions/curves, the smoothened number of normalized codewords per input $i \in (0, 2^{B_I}-1)$ (e.g., as integer values, etc.) in the growing window or sliding window may be used to derive real-time reshaping functions/curves as described herein.

Scene Change Detection

In some embodiments, a scene cut may be indicated in an input video signal to be reshaped into a reshaped signal. In some embodiments, a scene detector may be used to locate scene cuts or scene changes in a sequence of input images in an input video signal.

In some embodiments, scene cuts (or scene changes) in a sequence of input images (or frames) may be determined using one or more reshaping parameters that are computed by real-time reshaping operations without separately computing specific parameters just for the purpose of detecting scene cuts (or scene changes). For example, noise level measurements/computations may be used to discover relatively large changes that correspond to scene cuts or scene changes. Since noise levels are computed for determining required codewords, detecting scene cuts or scene changes with changes in noise levels may provide significant computational efficiencies over other scene detection approaches that employ extra computations of different types of content-dependent measurements/computations. Furthermore, even if within the same scene, large changes in noise levels indicate needs (e.g., scene changes) for using different reshaping functions/curves. Thus, detecting changes in noise levels may also be used to provide significant responsiveness over other approaches in terms of adapting reshaping operations responsively to variations of noise levels (e.g., multiple scene changes) within the same scene.

In some embodiments, a similarity value that measures similarity of noise levels between two adjacent images in a sequence of images may be computed. For example, the similarity value may be computed based on difference magnitudes in group noise levels such as minimal noise levels, etc., summed over M bins (of input codewords) between the two adjacent images (indexed by (j−1) and j) as follows:

$$SIM(j, j-1) = \sum_{m=0}^{M-1} \|b_{j-1,m} - b_{j,m}\| \quad (54)$$

where "$\| \ldots \|$" refers to a norm (e.g., an absolute value, a magnitude, etc.) of the enclosed quantity.

In some cases, a relatively small number of pixel values in images may produce relatively large impacts on a similarity value such as computed based on expression (54). To improve accuracy in measuring similarity between adjacent images, similarity values between adjacent images may also be calculated other than using expression (54).

In some embodiments, instead of or in addition to the similarity value based on expression (54), a similarity value may be computed as follows:

$$SIM(j, j-1) = \sum_{m=0}^{M-1} \|(h_{j,m} > T_h)(b_{j-1,m} - b_{j,m})\| \quad (54')$$

where $h_{j,m}$ represents a histogram count for the number of pixels in the m-th bin of the j-th image, and $T_h$ represents a histogram count threshold. This prevents codeword bins with relatively small numbers of pixels from dominating the similarity value.

Additionally, optionally or alternatively, a similarity value may be computed as follows: the bins with weighting factor a $$SIM(j, j-1) = \sum_{m=0}^{M-1} \|h_{j-1,m} \cdot b_{j-1,m} - h_{j,m} \cdot b_{j,m}\| \quad (54'')$$

where $h_{j,m}$ and $h_{j-1,m}$ represent histogram counts for the numbers of pixels in the m-th bin of the j-th image and the (j+1)-th image, respectively. These histograms are used as weight factors in computing the similarity value.

In various embodiments, these and other variations may be used to compute similarity values whose peak values may be used to detect scene cuts or changes.

Figure 10:
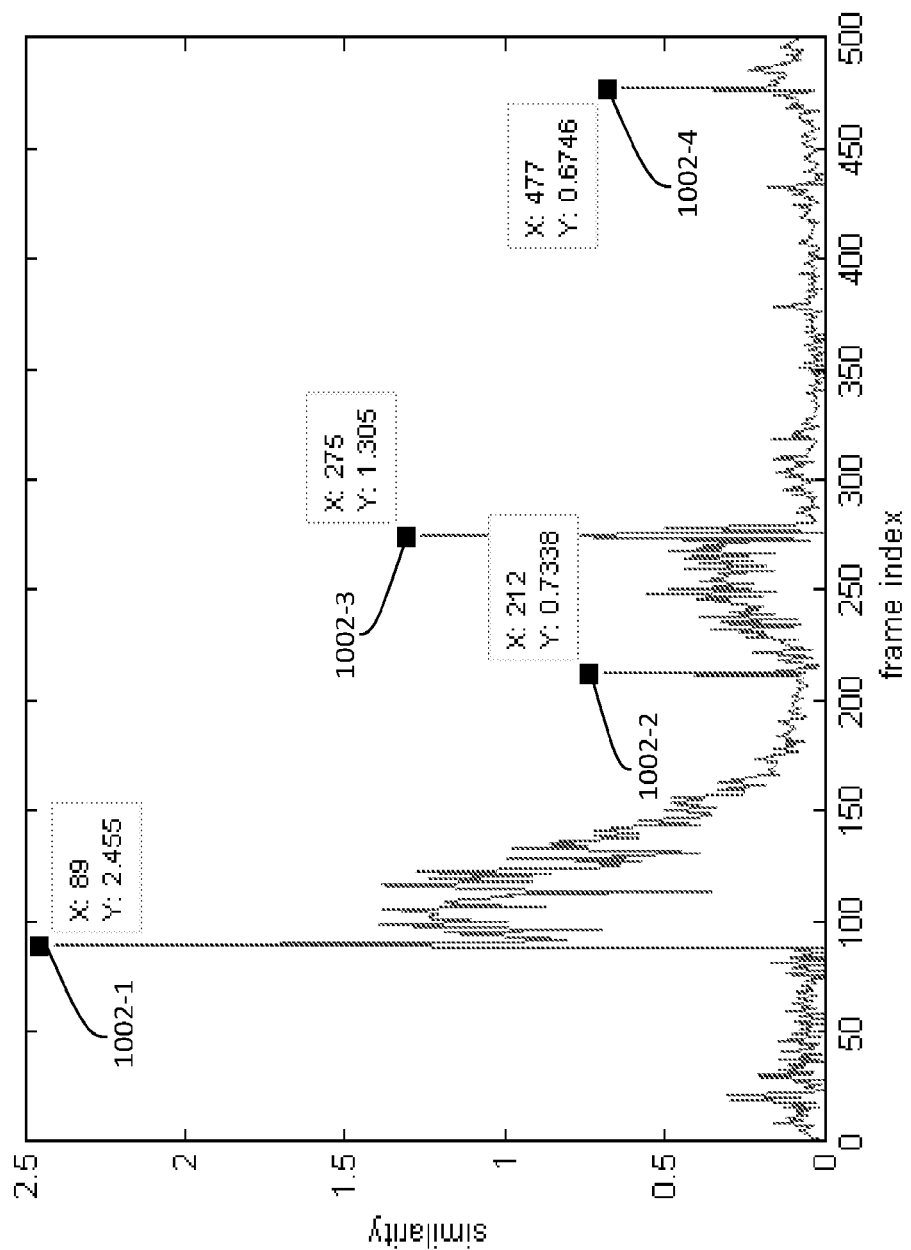
FIG. 10 and FIG. 11 illustrate example plots of similarity values computed for every two adjacent images (or frames) in a sequence of input images in accordance with example embodiments disclosed herein.

FIG. 10 illustrates an example plot of similarity values computed for every two adjacent images (or frames) in a sequence of input images. As can be seen in FIG. 10, scene cuts or scene changes may be detected as corresponding to high peaks (e.g., 1002-1 through 1002-4, etc.) of the similarity values.

Figure 11:
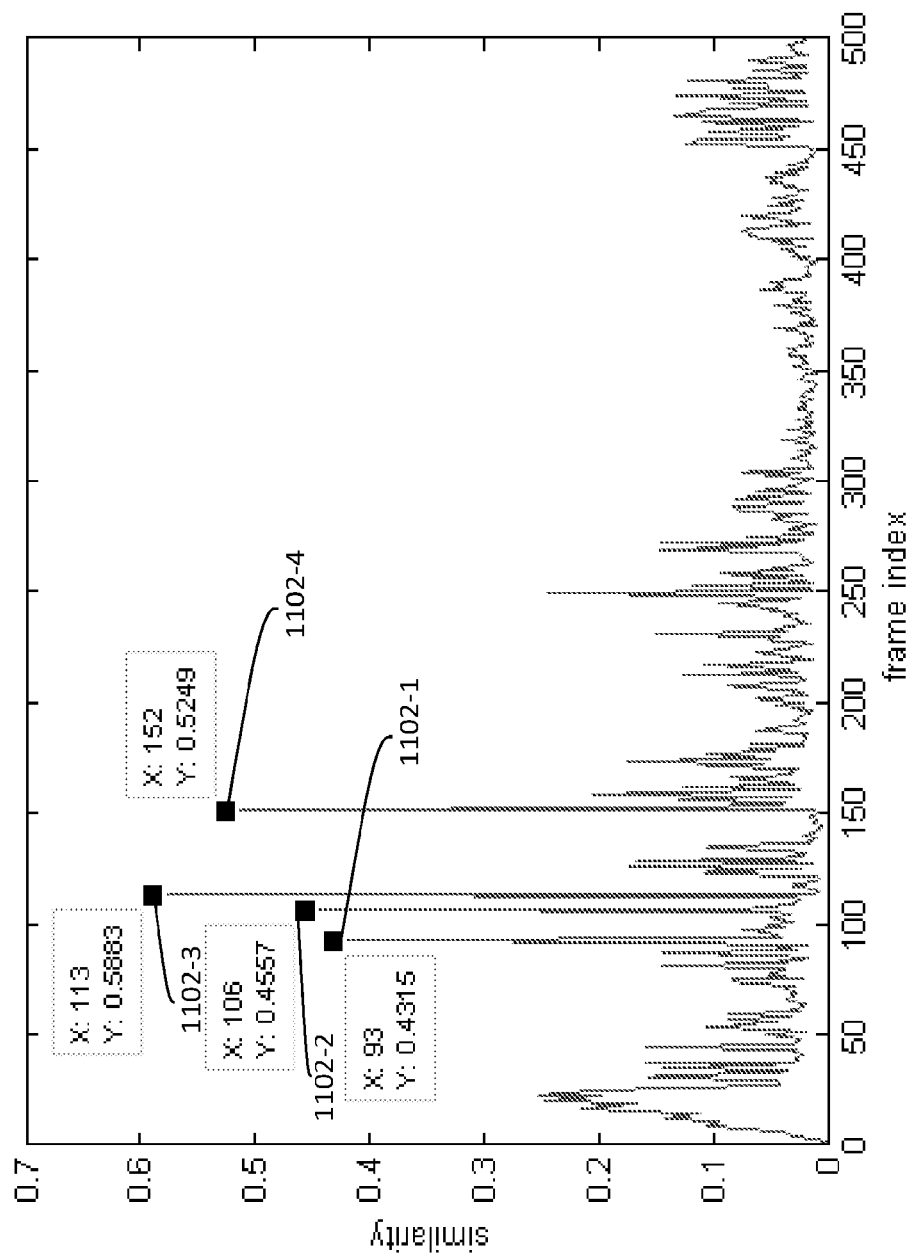

FIG. 11 illustrates another example plot of similarity values computed for every two adjacent images (or frames) in a sequence of input images. As can be seen in FIG. 11, scene cuts or scene changes may be detected as corresponding to high peaks (e.g., 1102-1 through 1102-4, etc.) of the similarity values. In some embodiments, some (e.g., 1102-1, 1102-4, etc.) of the high peaks may correspond to scene cuts (e.g., images captured by different cameras, images captured at different locations, images captured at different days, etc.), whereas some (e.g., 1102-2, 1102-3, etc.) of the high peaks may correspond to scene changes in the same scene (e.g., different objects appearing in the same scene, moving objects or figures, panning, etc.). In some embodiments, a scene change detected with relatively high changes in noise levels may be treated as starting a new scene in computations of some or all of reshaping parameters as described herein.

Reshaping Function Embedding

Reshaped images may be encoded into a compressed (e.g., lossless, etc.) reshaped signal and outputted to downstream recipient devices. An example reshaped signal may, but is not limited to only, a 10-bit baseband CAQ signal. Information relating to reshaping operations used to generate the reshaped signal may be embedded as reshaping related metadata (e.g., 812 of FIG. 8A, in a sub-bit-stream that carries data fields of reference processing units or RPUs, etc.). The reshaping related metadata can be used by a downstream recipient device to decode the reshaped signal into the reshaped images and apply/perform backward reshaping to convert the reshaped images (e.g., in 10-bits, etc.) to reconstructed versions of pre-reshaped images (e.g., in 12+ bits, etc.).

In some embodiments, the backward reshaping may be based at least in part on a backward reshaping function (e.g., a function derived with expression (23), etc.) represented or approximated by a plurality of polynomials such as 8-piece 2nd order polynomials for backward reshaping in the I channel of an IPT-PQ color space (used to represent the reshaped signal), one or more first order polynomials in P/T channels of the IPT-PQ color space. Polynomial coefficients, pivots, etc., that are used to define these polynomial may be transmitted as some or all of the reshaping related metadata to downstream recipient devices for the purpose of performing backward reshaping operations. Additionally, optionally or alternatively, the backward reshaping function (e.g., represented by polynomials, etc.) may be used to generate a lookup table (e.g., a one-dimensional LUT or 1D-LUT, etc.). The LUT may be transmitted as the reshaping related metadata in place of or in addition to other types of reshaping related metadata such as polynomial coefficients, pivots, etc. bit rate concern. Values contained in the LUT may be used directly by a downstream recipient device to perform the backward reshaping without computing polynomial values from the polynomials.

Figure 8B:
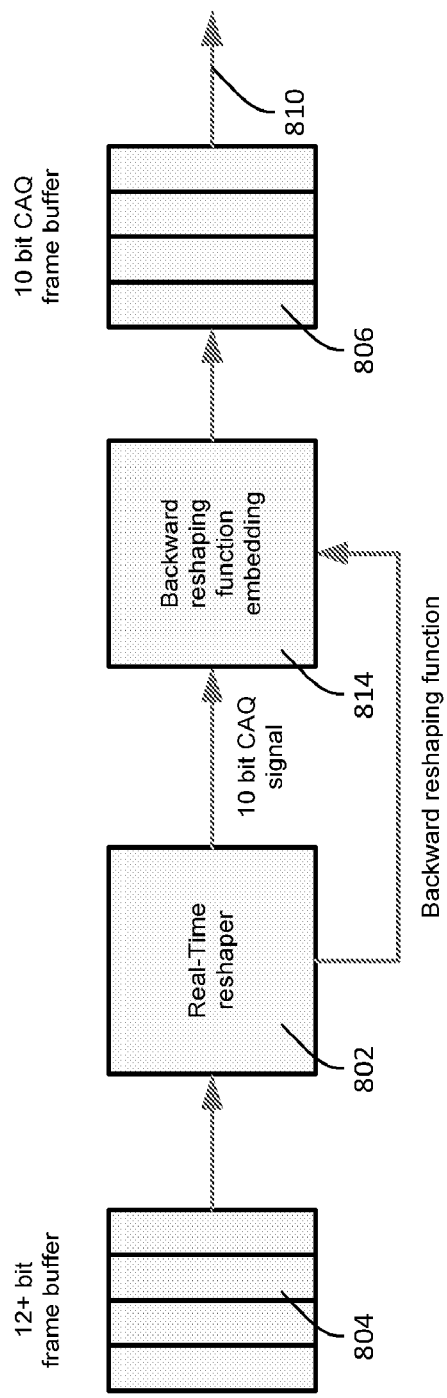
FIG. 8B illustrates example transmission of metadata in accordance with example embodiments disclosed herein.

FIG. 8B illustrates example transmission of metadata (e.g., reshaping related metadata, etc.) within reshaped images (e.g., in a 10 bit frame buffer of FIG. 8B, etc.). In addition to, or instead of, transmitting the reshaping related metadata as side information (e.g., such as illustrated in FIG. 8A, etc.), some or all of the reshaping related metadata may be transmitted within the reshaped image. This approach may be beneficially used in some embodiments in which side information transmission is difficult or even impossible to implement such as in scenarios in which a reshaped signal would be transmitted through a path comprising a high-definition serial digital interface (HD-SDI) link that does not support carriage of side information or that does not support carriage of sufficient side information.

In some embodiments, real-time reshaping as described herein is performed at a frame level by an upstream device comprising devices/modules/units as illustrated in FIG. 8A or FIG. 8B. Correspondingly, a downstream recipient device may perform backward reshaping operations on reshaped images at the frame level. This means that the backward reshaping operations may be based on frame-level information that needs to be synchronized with respective images or frames to which the frame-level information is related. In some embodiments, reshaping related metadata to be used to perform backward reshaping on an image may be embedded within the image or within another image preceding the image. Thus, techniques as described herein significantly lessen and avoid synchronization issues as compared with other approaches that rely on carriage of side information (e.g., 812 of FIG. 8A, separate from image data such as 810 of FIG. 8A or FIG. 8B, etc.) for transmitting reshaping related metadata.

Techniques as described herein can be used to support both lossless and lossy methods of embedding metadata in a video signal such as a reshaped video signal. It is observed that in some scenarios, in a video signal of a particular bit depth (e.g., 10 bits, etc.), a lower bit depth (e.g., 9 bits, corresponding to 512 available reshaped codewords, etc.) may be sufficient for P/T channels, as lossy compression resulted from reshaping pre-shaped codewords into available codewords from the lower bit depth does not introduce noticeable visual differences or artifacts relative to reshaping the pre-shaped codewords into available codewords from the particular bit depth higher than the lower bit depth.

For example, in many scenarios, the ratio factors $$\frac{v_H^{P(j)} - v_L^{P(j)}}{v_H^{(j)} - v_L^{(j)}} \text{ and } \frac{v_H^{T(j)} - v_L^{T(j)}}{v_H^{(j)} - v_L^{(j)}}$$

in expressions (41) and (42) for reshaping operations in the P/T channels are no larger than 1. Additionally, optionally, or alternatively, the weighting factors, $w^P$ and $w^T$, in these expressions may be set to 0.5. These implicit and/or explicit constraints (e.g., the ratio factors ≤1, the weighting factors ≤0.5, etc.) may be used to implement the lower bit depth (e.g., 9 bits, etc.) for codeword spaces used in reshaping operations for the P/T channels. The codeword spaces for the P/T channels may include (e.g., consist of, etc.) a first code space that comprises all available codewords for the P channel, a second code space that comprises all available codewords for the T channels, etc. The value ranges in the first code space for the P channel and the second code space for the T channel may be respectively given as follows:

$$R^{P(j)} = clip3\left(w^P(C_H^j - C_L^j)\left(\frac{v_H^{P(j)} - v_L^{P(j)}}{v_H^{(j)} - v_L^{(j)}}\right), 0, \text{mid\_range} - 1\right) \quad (55)$$

$$R^{T(j)} = clip3\left(w^T(C_H^j - C_L^j)\left(\frac{v_H^{T(j)} - v_L^{T(j)}}{v_H^{(j)} - v_L^{(j)}}\right), 0, \text{mid\_range} - 1\right) \quad (56)$$

As a result, reshaped codewords for the P/T channels can be fitted into the codeword spaces (e.g., 0~511) of the lower bit depth, with other parameters in expressions (41) and (42) to be set as follows:

$$C_L^{P(j)} = 0$$

$$C_H^{P(j)} = \text{mid\_range} - 1$$

$$C_L^{T(j)} = 0$$

$$C_H^{T(j)} = \text{mid\_range} - 1 \quad (57)$$

In some embodiments, quantization slope ratios between reshaped codeword ranges and pre-reshaped codeword ranges for the P/T channels may be defined as follows:

$$S^{P(j)} = \frac{C_H^{P(j)} - C_L^{P(j)}}{v_H^{P(j)} - v_L^{P(j)}} \quad (58)$$

$$S^{T(j)} = \frac{C_H^{T(j)} - C_L^{T(j)}}{v_H^{T(j)} - v_L^{T(j)}}$$

Reshaping codewords from pre-reshaped codewords (e.g., EDR codewords, etc.) to reshaped codewords (e.g., 9 bits, 0 to 511, etc.) for the P/T channels can be done by first subtracting the lowest value of a pre-reshaped codeword space (comprising all available pre-shaped codewords), then multiplying a quantization slope ratio, and adding the lowest value of the reshaped codeword space, as follows:

$$\tilde{P}_j(p) = Q_{BL}^{P(j)}(P_j(p)) = clip3(\lfloor S^{P(j)}(P_j(p) - v_L^{P(j)}) + C_L^{P(j)} + 0.5 \rfloor, 0, \text{mid\_range} - 1)$$

$$\tilde{T}_j(p) = Q_{BL}^{T(j)}(T_j(p)) = clip3(\lfloor S^{T(j)}(T_j(p) - v_L^{T(j)}) + C_L^{T(j)} + 0.5 \rfloor, 0, \text{mid\_range} - 1)$$

$$\tilde{P}_j(p) = \tilde{P}_j(p) << 1$$

$$\tilde{T}_j(p) = \tilde{T}_j(p) << 1 \quad (59)$$

where "<<" is a bit shift operation used to place the reshaped codeword in the most significant bits the number (e.g., 9 bits) of these most significant bits used to carry the reshaped codeword equal to the lower bit depth of a codeword of the particular depth (e.g., 10 bites) of the reshaped signal so that the least significant bit, bit 0, may be left out to be used for carrying metadata such as reshaping related metadata.

Denote the metadata to be embedded in the least significant bit (LSB), bit 0, as E(p). The reshaped signal in the P/T channels may be represented as follows:

$$\tilde{P}_j(p) = \tilde{P}_j(p) + E(p)$$

$$\tilde{T}_j(p) = \tilde{T}_j(p) + E(p) \quad (60)$$

On the decoder side (e.g., 130 of FIG. 1A or FIG. 1B, etc.), an extraction process may be performed to extract the LSB and recover the metadata, as follows:

$$E(p) = \tilde{P}_j(p) \& 0x1$$

$$E(p) = \tilde{T}_j(p) \& 0x1 \quad (61)$$

Extraction of reshaped codewords in the P/T channels may be performed using right shift operations, as follows:

$$\tilde{P}_j(p) = \tilde{P}_j(p) >> 1$$

$$\tilde{T}_j(p) = \tilde{T}_j(p) >> 1 \quad (62)$$

A backward reshaping function may be generated based on the metadata extracted from the reshaped signal. In some embodiments, the backward reshaping function can be derived and expressed in a closed form with a first order polynomial, as follows:

$$\hat{P}_j(p) = \frac{\tilde{P}_j(p) - C_L^{P(j)}}{S^{P(j)}} + v_L^{P(j)} \quad (63)$$

$$\hat{T}_j(p) = \frac{\tilde{T}_j(p) - C_L^{T(j)}}{S^{T(j)}} + v_L^{T(j)}$$

There may exist a large number of bits available in high-definition (HD) video frames or images for encoding codewords in the P/T channels. Thus, a proportionally large number of bits (e.g., one bit out of ten bits) may be available for embedding metadata in video frames or images.

In some embodiments, a 1D-LUT generated from a backward reshaping function may be transmitted by an upstream device as metadata embedded in images (e.g., LSB of the P/T channels of the images, etc.) to downstream recipient devices. The LUT provides a mapping from 10-bit reshaped codewords to 12-bit PQ codewords, which may be a reconstructed version of pre-shaped codewords that have been reshaped into the 10 bit reshaped codewords by the upstream device. In some embodiments, each entry in the LUT may take 12 bits. The entire LUT may amount to 1024*12=12,288 bits for each of the P/T channels. The LUT under this approach may be beneficially used by a downstream recipient device with relatively little computational power (e.g., in floating point computations) at a tradeoff of receiving slightly degraded images.

In some embodiments, a plurality of polynomials, such as eight 2nd order polynomials with nine pivot points, may be used to represent or approximate a backward reshaping function to be used by downstream recipient devices for backward reshaping. For polynomials representing a backward reshaping function in the I channel (or luma), 32 bits may be used for representing each polynomial coefficient, and 10 bits may be used for representing each pivot point. Thus, the overall payload for defining the polynomials approximating the backward reshaping function for the I channel may be 32*3*8=768 (bits) for coefficients and 10*9=70 (bits) for pivot points. In some embodiments, a backward reshaping function in each of the P/T channels may be represented with a single 1st order polynomial. The payload for defining the polynomial approximating the backward reshaping function in each of the P/T channels is 32*2=64 (bits) for coefficients and 10*2=20 (bit) for pivot points for each of the P/T channels. These bits representing the polynomial coefficients and the pivot points may be transmitted by an upstream device as metadata embedded in images (e.g., LSB of the P/T channels of the images, etc.) to downstream recipient devices. This approach may be beneficially used by a downstream recipient device with relatively large computational power (e.g., in floating point computations) at a tradeoff of receiving relatively high quality images.

Example Process Flows

FIG. 12A illustrates an example process flow according to an embodiment of the present invention. In some embodiments, one or more computing devices or components (e.g., a processor, an encoding block 120 of a media device, etc.) may perform this process flow. In block 1202, a processor calculates noise levels with a processor a set of input images (117) in an input bit depth.

In block 1204, the processor applies a noise-mask generation process (205) to the input image to generate a noise mask image. The noise mask image characterizes pixels in the input image in terms of their perceptual relevance to mask quantization noise.

In block 1206, the processor generates a noise-mask histogram (212) based on the input image and the noise mask image.

In block 1208, for one or more bins in the noise-mask histogram, the processor applies a masking-noise level to bit-depth function (215) to generate minimal bit depth values for the one or more bins.

In block 1210, the processor generates a codeword mapping function (220) based on the input bit depth, the minimal bit depth values, and a target bit depth.

In block 1212, the processor applies the codeword mapping function to the input image to generate an output image in the target bit depth, wherein the target bit depth is smaller than the input bit depth.

In an embodiment, noise-mask generation as described herein comprises: applying a first filter (305) to the input image to generate a first filtered image (L); generating a second image by computing the absolute value of the difference between the input image and the first filtered image; generating the noise mask image (H) by applying a second filter to the second image; etc.

In an embodiment, the first filter is a low-pass Gaussian filter.

In an embodiment, the second filter is a low-pass Gaussian filter.

In an embodiment, the processor is further configured to apply a pixel selection process to the noise mask image to eliminate pixels deemed not essential in the quantization process.

In an embodiment, noise-mask histogram generation as described herein comprises: computing a dynamic range of the input image based on the input bit depth; dividing the dynamic range into M sub-ranges, wherein M is an integer larger than 1; for the i-th sub-range: identifying all pixels in the input image which have pixels values within the i-th sub-range; for each pixel in the i-th sub-range, determining its corresponding noise-mask value in the noise mask image; determining the minimum of the noise-mask values for all pixels in the i-th sub-range; assigning to the i-th bin in the noise-mask histogram the minimum of the noise-mask values for the pixels in the i-th sub-range; etc.

In an embodiment, the input image is a high dynamic range image encoded according to gamma encoding or SMPTE ST 2084.

In an embodiment, the masking-noise level to bit-depth function is generated according to results from a perceptual user study.

In an embodiment, generating the codeword mapping function further comprises: generating a lower bound of normalized number of required codewords in the target bit depth based on the minimal bit depth values, the input bit depth and the target bit depth; allocating unused normalized codewords to the whole dynamic range of the input image according to an allocation scheme to generate updated normalized numbers of required codewords; generating the codeword mapping function by computing a cumulative sum of the updated normalized numbers of required codewords; etc.

In an embodiment, the processor is further configured to filters the updated normalized numbers of required codewords by a low-pass filter before generating the codeword mapping function.

In an embodiment, the low-pass filter comprises a (2N+1)-tap averaging filter; N is positive an integer.

In an embodiment, the allocation scheme comprises a proportional allocation scheme, where for the i-th input pixel value $$\tilde{d}_i = d_i + U \frac{d_i}{D},$$

where $\tilde{d}_i$ denotes the updated normalized number of codeword values, $d_i$ denotes the normalized number of required codewords, D denotes the sum of $d_i$ values, and U=1−D.

In an embodiment, the allocation scheme comprises a constant offset allocation scheme, where for the i-th input pixel value $$\tilde{d}_i = d_i + \frac{U}{v_H - v_L},$$

where $\tilde{d}_i$ denotes the updated normalized number of codeword values, $d_i$ denotes the normalized number of required codewords, if D denotes the sum of $d_i$ values, then U=1−D, $v_H$ denotes a maximum input pixel value, and $v_L$ denotes a minimum input pixel value.

In an embodiment, the allocation scheme comprises a histogram-based allocation scheme, where for the i-th input pixel value $$\tilde{d}_i = d_i + U \frac{h_i}{P},$$

where $\tilde{d}_i$ denotes the updated normalized number of codeword values, $d_i$ denotes the normalized number of required codewords, $h_i$ denotes the number of pixels in the input image with a value equal to i, if D denotes the sum of $d_i$ values, then U=1−D, and P denotes the total number of pixels under consideration in the input image.

In an embodiment, the allocation scheme comprises a scalar-based allocation scheme, where for the i-th input pixel value $$\tilde{d}_i = d_i + a\left(\frac{U}{v_H - v_L}\right) + (1-a)(i - v_L)\left(\frac{U}{v_H - v_L}\right),$$

where $\tilde{d}_i$ denotes the updated normalized number of codeword values, $d_i$ denotes the normalized number of required codewords, if D denotes the sum of $d_i$ values, then U=1−D, $\alpha$ is a scalar between 0 and 1, $v_H$ denotes a maximum input pixel value, and $v_L$ denotes a minimum input pixel value.

In an embodiment, generating the codeword mapping function for an input pixel value i comprises computing $$FL(i) = \sum_{k=0}^{i} s_k,$$

where $s_k$ values are derived based on the updated number of codeword values.

In an embodiment, generating the output image comprises computing:

$$s_p = \begin{cases} 0, & \text{if } i < v_L \\ 1, & \text{if } i > v_H \\ FL(i), & \text{if } v_L \le i \le v_H \end{cases},$$

where for a pixel $I_p$=i in the input image, $s_p$ denotes the corresponding, normalized, quantized output pixel, $v_H$ denotes a maximum input pixel value, and $v_L$ denotes a minimum input pixel value.

In an embodiment, the minimal bit depth values are computed based on minimal bit depth values computed across multiple consecutive frames in a video scene that includes the input image.

In an embodiment, the processor is further configured to add, upon determining that the target bit depth cannot be satisfied with the allocation step, noise or dithering to the input image according to the noise mask image and generating a newer lower bound of normalized number of required codewords to replace the lower bound of normalized number of required codewords.

FIG. 12B illustrates an example process flow according to an embodiment of the present invention. In some embodiments, one or more computing devices or components (e.g., a processor, an encoding block 120 of a media device, real-time reshaper 802 of FIG. 8A or FIG. 8B, etc.) may perform this process flow. In block 1252, a processor calculates noise levels in pre-reshaped codewords in a plurality of pre-reshaped images within a time window of a scene, the pre-reshaped codewords being of a pre-reshaped bit depth.

In block 1254, the processor determines a plurality of per-bin minimal bit depth values for a plurality of pre-reshaped codeword bins based at least in part on the calculated noise levels in the pre-reshaped codewords, each per-bin minimal bit depth value in the plurality of per-bin minimal bit depth values corresponding to a minimal bit depth value for a respective pre-reshaped codeword bin in the plurality of pre-reshaped codeword bins.

In block 1256, the processor generates, based at least in part on the pre-reshaped bit depth, the plurality of per-bin minimal bit depth values, and a target bit depth that is smaller than the pre-reshaped bit depth, a specific codeword mapping function for a specific pre-reshaped image in the plurality of pre-reshaped image.

In block 1258, the processor applies the specific codeword mapping function to specific pre-reshaped codewords of the specific pre-reshaped image to generate specific target codewords of a specific output image, the specific target codewords of the specific output image being of the target bit depth.

In an embodiment, the time window represents one of: a sliding window, a growing window, an entire duration of the scene, etc.

In an embodiment, the time window ends at one of: the specific image, a pre-reshaped image that is a fixed number of images away from the specific image, etc.

In an embodiment, the plurality of pre-reshaped images represents a proper subset in a set of all pre-reshaped images of the scene.

In an embodiment, each of the calculated noise levels represents a per-bin group value of noise levels of a pre-reshaped codeword bin in the plurality of pre-reshaped codeword bins; the noise levels of the pre-reshaped codeword bin are computed based on a portion of pixel values in the pre-reshaped image that contain pre-reshaped codewords in the pre-reshaped codeword bin.

In an embodiment, the per-bin group value is one of a minimum value, a mean value, or a maximum value.

In an embodiment, the plurality of pre-shaped images are represented in a perceptually quantized IPT color space (IPT-PQ).

In an embodiment, the plurality of pre-shaped images represents one of: a plurality of input images from an input video signal, a plurality of converted images converted from a plurality of input images from an input video signal, etc.

In an embodiment, the processor is further configured to perform: calculating second noise levels in second pre-reshaped codewords in a second plurality of pre-reshaped images within a second time window of the scene, the second pre-reshaped codewords being of the pre-reshaped bit depth; determining a second plurality of per-bin minimal bit depth values for the plurality of pre-reshaped codeword bins based at least in part on the calculated second noise levels in the second pre-reshaped codewords, each per-bin minimal bit depth value in the second plurality of per-bin minimal bit depth values corresponding to a minimal bit depth value for a respective pre-reshaped codeword bin in the plurality of pre-reshaped codeword bins; generating, based at least in part on the pre-reshaped bit depth, the second plurality of per-bin minimal bit depth values, and the target bit depth, a second specific codeword mapping function for a second specific pre-reshaped image in the second plurality of pre-reshaped image; applying the second specific codeword mapping function to second specific pre-reshaped codewords of the second specific pre-reshaped image to generate second specific target codewords of a second specific output image, the second specific target codewords of the second specific output image being of the target bit depth; etc.

In an embodiment, the second plurality of pre-reshaped images comprises a pre-reshaped image that immediately follows the plurality of pre-reshaped images; the second specific pre-reshaped image immediately follows the specific pre-reshaped image in a set of pre-reshaped images of the scene.

In an embodiment, the pre-reshaped codewords and the specific pre-reshaped codewords are of a luma type; the processor is further configured to perform: generating specific codeword mapping functions for the specific pre-reshaped image in the plurality of pre-reshaped image; applying the specific chroma codeword mapping functions to specific pre-reshaped chroma codewords of the specific pre-reshaped image to generate specific target chroma codewords of the specific output image; etc.

In an embodiment, the specific codeword mapping functions are generated without using the calculated noise levels.

In an embodiment, the specific target chroma codewords of the specific output image are represented in a chroma codeword space of a bit depth lower than the target bit depth; the processor is further configured to embed reshaping related metadata with the specific target chroma codewords in one or more chroma channels of target pixel values of the specific output image.

In an embodiment, the reshaping related metadata comprises one or more of: parameters defining one or more of the specific codeword mapping function or the specific chroma codeword mapping functions, lookup tables generated from one or more of the specific codeword mapping function or the specific chroma codeword mapping functions, parameters defining polynomials approximating one or more of the specific codeword mapping function or the specific chroma codeword mapping functions, etc.

In an embodiment, the processor is further configured to transmit reshaping related metadata separately from target pixel values of the specific output image.

In an embodiment, the calculated noise levels comprise one or more noise levels in the last pre-reshaped image in the plurality of pre-shaped images; the processor is further configured to perform: receiving a new pre-reshaped image immediately following the last pre-reshaped image in the plurality of pre-shaped images; calculating one or more second noise levels in second pre-reshaped codewords in the new pre-reshaped image, the second pre-reshaped codewords being of a pre-reshaped bit depth; deriving a similarity value between the last pre-reshaped image in the plurality of pre-shaped images and the new image based at least in part on the one or more noise levels and the one or more second noise levels; determining whether the similarity value indicates a scene change beginning at the new re-shaped image; etc.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to adaptive perceptual quantization of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
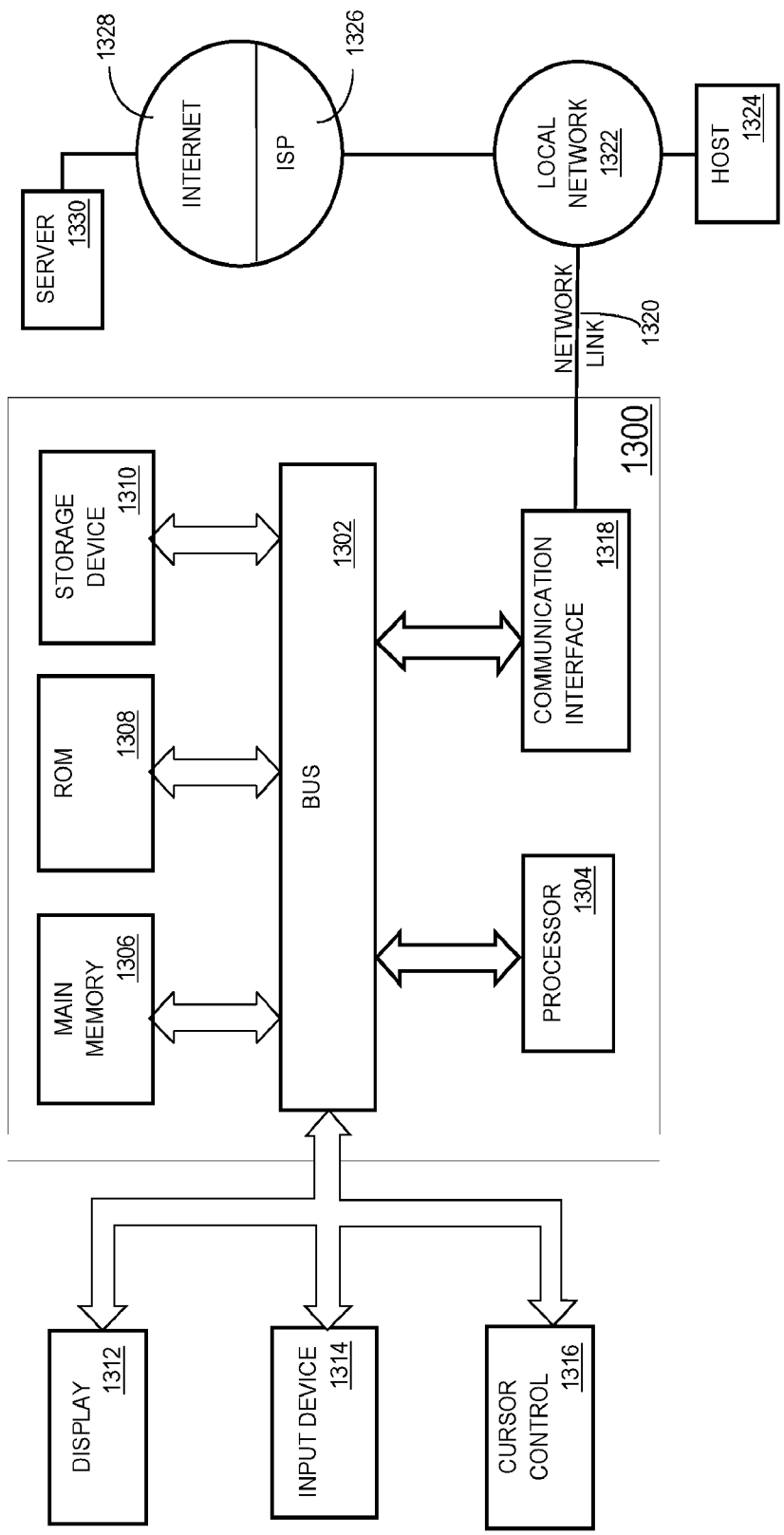
FIG. 13 illustrates a simplified block diagram of an example hardware platform on which a computer or a computing device as described herein may be implemented.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a liquid crystal display, for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques as described herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Example embodiments that relate to the efficient adaptive perceptual quantization of HDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   calculating noise levels in pre-reshaped codewords in a plurality of pre-reshaped images within a time window of a scene, the pre-reshaped codewords being of a pre-reshaped bit depth;
   determining a plurality of per-bin minimal bit depth values for a plurality of pre-reshaped codeword bins based at least in part on the calculated noise levels in the pre-reshaped codewords, each per-bin minimal bit depth value in the plurality of per-bin minimal bit depth values corresponding to a minimal bit depth value for a respective pre-reshaped codeword bin in the plurality of pre-reshaped codeword bins;
   generating, based at least in part on the pre-reshaped bit depth, the plurality of per-bin minimal bit depth values, and a target bit depth that is smaller than the pre-reshaped bit depth, a specific codeword mapping function for a specific pre-reshaped image in the plurality of pre-reshaped image; and
   applying the specific codeword mapping function to specific pre-reshaped codewords of the specific pre-reshaped image to generate specific target codewords of a specific output image, the specific target codewords of the specific output image being of the target bit depth.

2. The method of claim 1, wherein the time window represents one of (a) a sliding window, (b) a growing window, or (c) an entire duration of the scene.

3. The method of claim 1, wherein the time window ends at one of (a) the specific image, or (b) a pre-reshaped image that is a fixed number of images away from the specific image.

4. The method of claim 1, wherein the plurality of pre-reshaped images represents a proper subset in a set of all pre-reshaped images of the scene.

5. The method of claim 1, wherein each of the calculated noise levels represents a per-bin group value of noise levels of a pre-reshaped codeword bin in the plurality of pre-reshaped codeword bins, and wherein the noise levels of the pre-reshaped codeword bin are computed based on a portion of pixel values in the pre-reshaped image that contain pre-reshaped codewords in the pre-reshaped codeword bin.

6. The method of claim 5, wherein the per-bin group value is one of a minimum value, a mean value, or a maximum value.

7. The method of claim 1, wherein the plurality of pre-shaped images are represented in a perceptually quantized IPT color space (IPT-PQ).

8. The method of claim 1, wherein the plurality of pre-shaped images represents one of (a) a plurality of input images from an input video signal, or (b) a plurality of converted images converted from a plurality of input images from an input video signal.

9. The method of claim 1, further comprising:
calculating second noise levels in second pre-reshaped codewords in a second plurality of pre-reshaped images within a second time window of the scene, the second pre-reshaped codewords being of the pre-reshaped bit depth;
determining a second plurality of per-bin minimal bit depth values for the plurality of pre-reshaped codeword bins based at least in part on the calculated second noise levels in the second pre-reshaped codewords, each per-bin minimal bit depth value in the second plurality of per-bin minimal bit depth values corresponding to a minimal bit depth value for a respective pre-reshaped codeword bin in the plurality of pre-reshaped codeword bins;
generating, based at least in part on the pre-reshaped bit depth, the second plurality of per-bin minimal bit depth values, and the target bit depth, a second specific codeword mapping function for a second specific pre-reshaped image in the second plurality of pre-reshaped image; and
applying the second specific codeword mapping function to second specific pre-reshaped codewords of the second specific pre-reshaped image to generate second specific target codewords of a second specific output image, the second specific target codewords of the second specific output image being of the target bit depth.

10. The method of claim 9, wherein the second plurality of pre-reshaped images comprises a pre-reshaped image that immediately follows the plurality of pre-reshaped images, and wherein the second specific pre-reshaped image immediately follows the specific pre-reshaped image in a set of pre-reshaped images of the scene.

11. The method of claim 1, wherein the pre-reshaped codewords and the specific pre-reshaped codewords are of a luma type; further comprising:
generating specific codeword mapping functions for the specific pre-reshaped image in the plurality of pre-reshaped image; and
applying the specific chroma codeword mapping functions to specific pre-reshaped chroma codewords of the specific pre-reshaped image to generate specific target chroma codewords of the specific output image.

12. The method of claim 11, wherein the specific codeword mapping functions are generated without using the calculated noise levels.

13. The method of claim 11, wherein the specific target chroma codewords of the specific output image are represented in a chroma codeword space of a bit depth lower than the target bit depth; further comprising embedding reshaping related metadata with the specific target chroma codewords in one or more chroma channels of target pixel values of the specific output image.

14. The method of claim 13, wherein the reshaping related metadata comprises one or more of: (a) parameters defining one or more of the specific codeword mapping function or the specific chroma codeword mapping functions, (b) lookup tables generated from one or more of the specific codeword mapping function or the specific chroma codeword mapping functions, or (c) parameters defining polynomials approximating one or more of the specific codeword mapping function or the specific chroma codeword mapping functions.

15. The method of claim 1, further comprising transmitting reshaping related metadata separately from target pixel values of the specific output image.

16. The method of claim 1, wherein the calculated noise levels comprise one or more noise levels in the last pre-reshaped image in the plurality of pre-shaped images; further comprising:
receiving a new pre-reshaped image immediately following the last pre-reshaped image in the plurality of pre-shaped images;
calculating one or more second noise levels in second pre-reshaped codewords in the new pre-reshaped image, the second pre-reshaped codewords being of a pre-reshaped bit depth;
deriving a similarity value between the last pre-reshaped image in the plurality of pre-shaped images and the new image based at least in part on the one or more noise levels and the one or more second noise levels;
determining whether the similarity value indicates a scene change beginning at the new re-shaped image.

17. An apparatus comprising a processor and configured to perform the method recited in claim 1.

18. A non-transitory computer-readable storage medium having stored thereon computer-executable instruction for executing a method in accordance with claim 1.

19. A system comprising:
a subsystem implemented at least in part in hardware that calculates noise levels in pre-reshaped codewords in a plurality of pre-reshaped images within a time window of a scene, the pre-reshaped codewords being of a pre-reshaped bit depth;
a subsystem implemented at least in part in hardware that determines a plurality of per-bin minimal bit depth values for a plurality of pre-reshaped codeword bins based at least in part on the calculated noise levels in the pre-reshaped codewords, each per-bin minimal bit depth value in the plurality of per-bin minimal bit depth values corresponding to a minimal bit depth value for a respective pre-reshaped codeword bin in the plurality of pre-reshaped codeword bins;
a subsystem implemented at least in part in hardware that generates, based at least in part on the pre-reshaped bit depth, the plurality of per-bin minimal bit depth values, and a target bit depth that is smaller than the pre-reshaped bit depth, a specific codeword mapping function for a specific pre-reshaped image in the plurality of pre-reshaped image; and
a subsystem implemented at least in part in hardware that applies the specific codeword mapping function to specific pre-reshaped codewords of the specific pre-reshaped image to generate specific target codewords of a specific output image, the specific target codewords of the specific output image being of the target bit depth.

* * * * *